US009882623B2

(12) United States Patent
Sun et al.

(10) Patent No.: US 9,882,623 B2
(45) Date of Patent: Jan. 30, 2018

(54) DUAL THREAD FEEDBACK DESIGN FOR NON-ORTHOGONAL CHANNELS

(71) Applicant: QUALCOMM Incorporated, San Diego, CA (US)

(72) Inventors: Jing Sun, San Diego, CA (US); Tao Luo, San Diego, CA (US); Siddhartha Mallik, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/850,737

(22) Filed: Sep. 10, 2015

(65) Prior Publication Data

US 2016/0088646 A1    Mar. 24, 2016

Related U.S. Application Data

(60) Provisional application No. 62/052,461, filed on Sep. 18, 2014.

(51) Int. Cl.
*H04W 4/00* (2009.01)
*H04B 7/06* (2006.01)
(Continued)

(52) U.S. Cl.
CPC ......... *H04B 7/0619* (2013.01); *H04B 7/0452* (2013.01); *H04B 7/0456* (2013.01);
(Continued)

(58) Field of Classification Search
CPC .. H04B 7/0619; H04B 7/0452; H04B 7/0456; H04B 7/0626; H04B 7/0632;
(Continued)

(56) References Cited

U.S. PATENT DOCUMENTS 8,867,494 B2 * 10/2014 Blanz ................ H04B 7/024
370/332
2007/0191066 A1 * 8/2007 Khojastepour ...... H04B 7/0408
455/562.1
(Continued)

FOREIGN PATENT DOCUMENTS

WO    WO-2013116987 A1    8/2013

OTHER PUBLICATIONS

ISA/EPO, International Search Report and Written Opinion of the International Searching Authority, Int'l. App. No. PCT/US2015/049567, dated Nov. 20, 2015, European Patent Office, Rijswijk, NL, 15 pgs.
(Continued)

*Primary Examiner* — Kevin Mew
(74) *Attorney, Agent, or Firm* — Nerrie M. Zohn

(57) ABSTRACT

Dual-thread feedback for non-orthogonal channels used in wireless communications systems is described. A first feedback thread may employ transmission strategy (TS) independent feedback and a second feedback thread may employ TS dependent feedback. The first feedback thread may include channel feedback from channel measurements (e.g., channel gain, noise covariance, etc.) and may be fed back periodically. A TS space may be determined that includes combinable TSs for UEs that may be grouped for non-orthogonal techniques, and one or more TS sets may be sent to the UEs. UEs may determine channel quality and/or other channel state information (CSI) for the TSs and report CSI for one or more TSs of the TS sets in a second feedback thread. Scheduling may be performed for transmissions to the UEs based on the feedback in the first and/or second feedback threads.

30 Claims, 13 Drawing Sheets

(51) Int. Cl.
*H04B 7/0456* (2017.01)
*H04L 1/00* (2006.01)
*H04W 72/12* (2009.01)
*H04B 7/0452* (2017.01)

(52) U.S. Cl.
CPC ......... *H04B 7/0626* (2013.01); *H04B 7/0632* (2013.01); *H04B 7/0636* (2013.01); *H04L 1/0025* (2013.01); *H04L 1/0026* (2013.01); *H04L 1/0028* (2013.01); *H04W 72/1226* (2013.01)

(58) Field of Classification Search
CPC ... H04B 7/0636; H04L 1/0025; H04L 1/0026; H04L 1/0028; H04W 72/1226
See application file for complete search history.

(56) References Cited

U.S. PATENT DOCUMENTS

| | | |
|---|---|---|
| 2008/0025336 A1 | 1/2008 | Cho et al. |
| 2008/0095223 A1* | 4/2008 | Tong ..................... H04L 1/0026 375/228 |
| 2008/0188190 A1* | 8/2008 | Prasad ................. H04B 7/0617 455/114.3 |
| 2008/0219145 A1* | 9/2008 | Sundaresan ........... H04L 47/283 370/203 |
| 2009/0080560 A1* | 3/2009 | Na ....................... H04B 7/0617 375/267 |
| 2009/0291699 A1* | 11/2009 | Heath .................... H04B 7/022 455/501 |
| 2010/0322176 A1* | 12/2010 | Chen ..................... H04B 7/024 370/329 |
| 2010/0323684 A1* | 12/2010 | Cai ...................... H04B 7/2606 455/422.1 |
| 2011/0032839 A1 | 2/2011 | Chen et al. |
| 2011/0135033 A1* | 6/2011 | Ko ....................... H04B 7/0413 375/295 |
| 2011/0142147 A1 | 6/2011 | Chen et al. |
| 2011/0188393 A1 | 8/2011 | Mallik et al. |
| 2011/0310870 A1* | 12/2011 | Van Nee ............. H04B 7/0626 370/338 |
| 2012/0270535 A1 | 10/2012 | Chen et al. |
| 2012/0320848 A1* | 12/2012 | Chen .................... H04W 28/06 370/329 |
| 2013/0114455 A1* | 5/2013 | Yoo ...................... H04W 24/00 370/252 |
| 2013/0225220 A1* | 8/2013 | Dotzler ............. H04W 72/1226 455/509 |
| 2013/0315337 A1* | 11/2013 | Dai ...................... H04L 1/0031 375/267 |
| 2014/0003395 A1* | 1/2014 | Hsu ..................... H04B 7/0478 370/335 |
| 2015/0078472 A1* | 3/2015 | Vook ................... H04B 7/0617 375/267 |
| 2015/0349866 A1 | 12/2015 | Benjebbour et al. |
| 2016/0087694 A1 | 3/2016 | Vilaipornsawai et al. |
| 2016/0119807 A1* | 4/2016 | Sun ...................... H04W 24/10 370/252 |
| 2016/0285525 A1* | 9/2016 | Budianu ............. H04B 7/0417 |
| 2016/0294454 A1* | 10/2016 | Onggosanusi ....... H04B 7/0456 |
| 2017/0142733 A1* | 5/2017 | Wang .................. H04W 72/082 |
| 2017/0265145 A1 | 9/2017 | Benjebbour et al. |

OTHER PUBLICATIONS

Roessler et al., "LTE-Advanced (3GPP Re. 11) Technology Introduction: White Paper," Jul. 2013, 39 pgs., XP_55166782A, 1MA232_1E, Rohde & Schwarz.

Zakhour et al., "A Two-Stage Approach to Feedback Design in Multi-User MIMO Channels with Limited Channel State Information," The 18th Annual IEEE International Symposium on Personal, Indoor and Mobile Radio Communications (PIMRC '07), Athens, Sep. 3-7, 2007, 5 pgs., ISBN 978-1-4244-1144-3, Institute of Electrical and Electronics Engineers.

ZTE, "Discussion on CSI Feedback for CoMP Based on Carrier Aggregation Feedback Structure," 3GPP TSG RAN WG1 Meeting #67, R1-113763, San Francisco, USA, Nov. 14-18, 2011, 3 pgs., 3rd Generation Partnership Project.

ZTE, "CSI Feedback Modes for CoMP," 3GPP TSG RAN WG1 Meeting #69, R1-122135, Prague, Czech Republic, May 21-25, 2012, 5 pgs., 3rd Generation Partnership Project.

ITRI: "Discussion on MU-CSI", 3GPP TSG-RAN WG1 Meeting #73, R2-132252, Fukuoka, Japan, May 20-24, 2013, 4 pgs., XP050698024, 3rd Generation Partnership Project.

Motorola: "CQI Enhancements for Release-10", 3GPP TSG RAN1 Meeting #62bis, R1-105616, Xian, China, Oct. 11-15, 2010, 6 pgs., XP050450694, 3rd Generation Partnership Project.

IPEA/EP, Second Written Opinion of the International Preliminary Examining Authority, Int'l Application No. PCT/US2015/049567, dated Sep. 6, 2016, European Patent Office, Munich, DE, 9 pgs.

Benjebbour et al. "Concept and Practical Considerations of Non-orthogonal Multiple Access (NOMA) for Future Radio Access," 2013 International Symposium on Intelligent Signal Processing and Communications Systems (ISPACS), Naha, Nov. 12-15, 2013, pp. 770-774, XP_32541968A, Institute of Electrical and Electronics Engineers.

* cited by examiner

US 9,882,623 B2

DUAL THREAD FEEDBACK DESIGN FOR NON-ORTHOGONAL CHANNELS

CROSS REFERENCES

The present application for patent claims priority to U.S. Provisional Patent Application No. 62/052,461 by Sun et al., entitled "Dual Thread Feedback Design for NOMA," filed Sep. 18, 2014, assigned to the assignee hereof, and expressly incorporated by reference herein.

FIELD OF THE DISCLOSURE

The present disclosure, for example, relates to wireless communication systems, and more particularly to feedback and scheduling for non-orthogonal channels used in wireless communication.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Communication systems may support communication over a carrier using multiple transmission layers. In some cases, the transmission layers may overlap in time and/or frequency. Such communication systems may take advantage of multiple antenna techniques for increased reliability or capacity. Multiple antenna techniques include transmit diversity, multiple-input multiple-output (MIMO) techniques and non-orthogonal multiple access (NOMA) techniques. Multiple antenna systems that employ T transmit antennas and R receive antennas may realize a capacity increase of $\min\{T, R\}$ over single antenna techniques. However, in a multiple access system, the possible variations in techniques employing multiple antennas including, for example, single-user MIMO (SU-MIMO), multiple-user MIMO (MU-MIMO), and NOMA results in challenges in optimizing channel scheduling over the space of possible transmissions to multiple UEs.

SUMMARY

The described features generally relate to one or more improved systems, methods, and/or apparatuses for dual-thread feedback for non-orthogonal channels used in wireless communication systems. The described features may include a first feedback thread including reporting of channel feedback by user equipments (UEs) for non-orthogonal channels to a serving eNode-B (eNB). The channel feedback may include one or more elements of a channel measurement matrix determined from the channel matrix and noise covariance matrix of the non-orthogonal channel, and may be independent of a transmission strategy (TS) to be used for communication with the UEs over the non-orthogonal channels. The serving eNB may determine one or more TS sets associated with multiple UEs and send the TS sets to the UEs, which may select one or more TSs from each TS set and report at least a subset of channel state information (CSI) for the selected TSs in a second feedback thread. The TSs may be assembled into the TS sets according to multiple access techniques, transmission modes, and/or type of CSI feedback. The serving eNB may perform scheduling for transmissions to the multiple UEs based on the channel feedback from the first feedback thread and/or the CSI from the second feedback thread.

A method for wireless communication at a UE is described, the method including reporting channel feedback for non-orthogonal channels of a carrier, receiving a plurality of potential transmission strategies for downlink transmissions over the carrier, reporting channel quality for at least one transmission strategy of the plurality of potential transmission strategies, and receiving a downlink transmission over one or more of the non-orthogonal channels according to a transmission strategy selected from the at least one transmission strategy.

An apparatus for wireless communication by a UE is described, including means for reporting channel feedback for non-orthogonal channels of a carrier, means for receiving a plurality of potential transmission strategies for downlink transmissions over the carrier, means for reporting channel quality for at least one transmission strategy of the plurality of potential transmission strategies, and means for receiving a downlink transmission over one or more of the non-orthogonal channels according to a transmission strategy selected from the at least one transmission strategy.

An apparatus for wireless communication by a UE is described, including a processor, and a memory in electronic communication with the processor and instructions stored in the memory, the instructions being executable by the processor to report channel feedback for non-orthogonal channels of a carrier, receive a plurality of potential transmission strategies for downlink transmissions over the carrier, report channel quality for at least one transmission strategy of the plurality of potential transmission strategies, and receive a downlink transmission over one or more of the non-orthogonal channels according to a transmission strategy selected from the at least one transmission strategy.

A non-transitory computer-readable medium storing code for wireless communication by a UE is described, the code comprising instructions executable by a processor for reporting channel feedback for non-orthogonal channels of a carrier, receiving a plurality of potential transmission strategies for downlink transmissions over the carrier, reporting channel quality for at least one transmission strategy of the plurality of transmission strategies, and receiving a downlink transmission over one or more of the non-orthogonal channels according to a transmission strategy selected from the at least one transmission strategy.

Some examples of the method described above may include determining a channel feedback matrix based on a channel matrix and a noise covariance matrix for the non-orthogonal channels. In some examples of the method described above, the reporting the channel feedback includes reporting at least one component of the channel feedback matrix. Some examples of the apparatuses and/or non-transitory computer-readable medium described above may include means for, instructions that are executable by the processor for, and/or code for performing these features.

In some examples of the method described above determining the channel feedback matrix is further based on a precoding matrix. The precoding matrix may be a default precoding matrix for the non-orthogonal channels. Some examples of the method described above may include compressing reported values for the at least one component of the channel feedback matrix according to a frequency domain correlation, a time domain correlation, or a combination thereof. Some examples of the apparatuses and/or non-transitory computer-readable medium described above may include means for, instructions that are executable by the processor for, and/or code for performing these features.

In some examples of the method described above, a first transmission strategy of the plurality of potential transmission strategies includes a first data transmission for the UE and a second data transmission for a different UE. In some examples of the method described above, determining the channel quality for the first transmission strategy may be based on an estimate of channel quality for the first data transmission subject to noise from the second data transmission. In some examples of the method described above, determining the channel quality for the first transmission strategy may be based on an estimate of channel quality for the first data transmission after interference cancellation of the second data transmission. Some examples of the apparatuses and/or non-transitory computer-readable medium described above may include means for, instructions that are executable by the processor for, and/or code for performing these features.

In some examples of the method described above, the at least one transmission strategy may include at least one single user transmission strategy and at least one multiple-user transmission strategy. In some examples of the method described above, the plurality of potential transmission strategies are assembled into one or more transmission strategy sets. Some examples of the method described above may include selecting the at least one transmission strategy from the plurality of potential transmission strategies, wherein the at least one transmission strategy includes one or more transmission strategies from each of the one or more transmission strategy sets. Some examples of the apparatuses and/or non-transitory computer-readable medium described above may include means for, instructions that are executable by the processor for, and/or code for performing these features.

In some examples of the method described above, each transmission strategy of the plurality of potential transmission strategies may include any of a precoding matrix, a first set of spatial layers for transmissions to the UE, a second set of spatial layers for transmissions to at least one other UE, whether interference cancellation is applied to achieve a channel quality associated with the each transmission strategy, or combinations thereof. Some examples of the apparatuses and/or non-transitory computer-readable medium described above may include means for, instructions that are executable by the processor for, and/or code for performing these features.

A method of wireless communication at a base station is described, the method including receiving channel feedback from multiple UEs for non-orthogonal channels of a carrier, sending, to one or more UEs of the multiple UEs, respective sets of potential transmission strategies for the one or more UEs for downlink transmissions over the carrier based at least in part on the channel feedback, receiving channel quality associated with at least a subset of each of the respective sets of potential transmission strategies from one or more UEs of the multiple UEs, selecting one or more transmission strategies for a set of downlink transmissions based at least in part on the received channel quality, and transmitting the set of downlink transmissions to at least a subset of the multiple UEs over the one or more non-orthogonal channels according to the selected transmission strategies.

An apparatus for wireless communication by a base station is described, the apparatus including means for receiving channel feedback from multiple UEs for non-orthogonal channels of a carrier, means for sending, to one or more UEs of the multiple UEs, respective sets of potential transmission strategies for the one or more UEs for downlink transmissions over the carrier based at least in part on the channel feedback, means for receiving channel quality associated with at least a subset of the respective sets of potential transmission strategies from one or more UEs of the multiple UEs, means for selecting one or more transmission strategies for a set of downlink transmissions based at least in part on the received channel quality, and means for transmitting the set of downlink transmissions to at least a subset of the multiple UEs over the one or more non-orthogonal channels according to the selected transmission strategies.

An apparatus for wireless communication by a base station is described, the apparatus including a processor, and a memory in electronic communication with the processor and instructions stored in the memory, the instructions being executable by the processor to receive channel feedback from multiple UEs for non-orthogonal channels of a carrier, send, to one or more UEs of the multiple UEs, respective sets of potential transmission strategies for the one or more UEs for downlink transmissions over the carrier based at least in part on the channel feedback, receive channel quality associated with at least a subset of the respective sets of potential transmission strategies from one or more UEs of the multiple UEs, select one or more transmission strategies for a set of downlink transmissions based at least in part on the received channel quality, and transmit the set of downlink transmissions to at least a subset of the multiple UEs over the one or more non-orthogonal channels according to the selected transmission strategies.

A non-transitory computer-readable medium storing code for wireless communication by a base station is described, the code including instructions executable by a processor for receiving channel feedback from multiple UEs for non-orthogonal channels of a carrier, sending, to one or more UEs of the multiple UEs, respective sets of potential transmission strategies for the one or more UEs for downlink transmissions over the carrier based at least in part on the channel feedback, receiving channel quality associated with at least a subset of the respective sets of potential transmission strategies from one or more UEs of the multiple UEs, selecting one or more transmission strategies for a set of downlink transmissions based at least in part on the received channel quality, and transmitting the set of downlink transmissions to at least a subset of the multiple UEs over the one or more non-orthogonal channels according to the selected transmission strategies.

In some examples of the method described above, the sending the respective sets of potential transmission strategies for the one or more UEs includes grouping UEs for transmission strategies of the respective sets of potential transmission strategies based at least in part on the channel feedback, wherein UEs grouped for a transmission strategy are assigned to at least partially overlapping resources of the non-orthogonal channels for the transmission strategy. In some examples of the method described above, the respective sets of potential transmission strategies may include a first transmission strategy associated with a first potential UE group. In some examples of the method described above, at least one UE of the first potential UE group utilizes a single spatial layer for the first transmission strategy. In some examples of the method described above, at least one UE of the first potential UE group utilizes multiple spatial layers for the first transmission strategy. In some examples of the method described above, transmissions for the first transmission strategy to at least two UEs of the first potential UE group are orthogonal. In some examples of the method described above, transmissions for the first transmission strategy to at least two UEs of the first potential UE group are non-orthogonal. In some examples of the method described above, a transmission power is split between the at least two UEs of the first potential UE group. In some examples of the method described above, the respective sets of potential transmission strategies comprise one or more sets of potential transmission strategies associated with each UE of the multiple UEs.

Some examples of the method described above may include scheduling transmission resources of the non-orthogonal channels for the at least one UE of the multiple UEs based on the received channel feedback. Some examples of the method described above may include determining that channel conditions have changed for at least one UE of the multiple UEs based at least in part on the channel quality reports, and triggering reporting of updated channel feedback from the at least one UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques generally relating to one or more improved systems, methods, and/or apparatuses for dual-thread feedback for non-orthogonal channels of a carrier employing non-transmission strategy (TS) dependent feedback in a first feedback thread and TS-dependent feedback in a second feedback thread are described. The first feedback thread may include channel feedback from channel measurements (e.g., channel gain, noise covariance, etc.) and may be fed back periodically. The eNB may determine a TS space that includes combinable TSs for UEs that may be grouped for transmissions and send one or more sets of TSs to the UEs. The UEs may determine channel quality and/or other channel state information (CSI) for the TSs and feedback channel quality for one or more TSs of the TS sets. In some cases, the UEs may select one or more TSs from each TS set and feedback channel quality for the selected TSs. The eNB may perform scheduling of transmissions to the UEs based on the channel feedback from the first feedback thread and/or channel quality from the second feedback thread.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
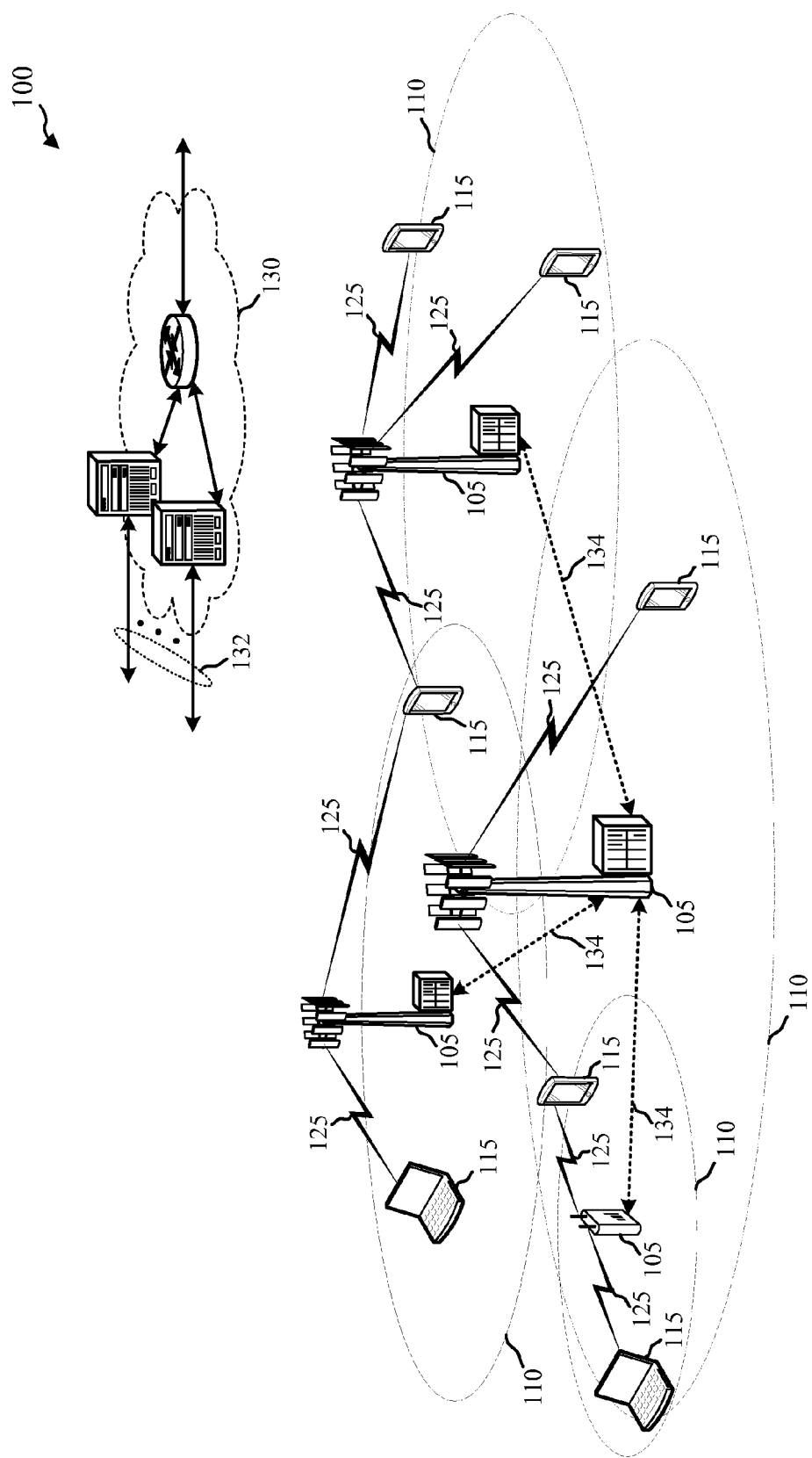
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell may also cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The communication links 125 may transmit bidirectional communications using FDD (e.g., using paired spectrum resources) or TDD operation (e.g., using unpaired spectrum resources). Each communication link 125 may include one or more carriers, where each carrier may span a different frequency range and define a channel structure for modulation of information conveyed on the UL, DL, or both UL and DL over the frequency range. For example, each carrier may include one or more formatting channels, one or more control channels, one or more indicator channels, one or more data channels, and the like. Each carrier may have a designated channel number (e.g., E-UTRA Absolute Radio Frequency Channel Number (EARFCN), etc.) based on a relationship between the channel number and the carrier frequency within an operating band.

LTE/LTE-A utilizes multi-carrier modulation (MCM) techniques including orthogonal frequency division multiple-access (OFDMA) on the downlink and single-carrier frequency division multiple-access (SC-FDMA) on the uplink. Each MCM carrier is a waveform signal made up of multiple sub-carriers (e.g., orthogonal sub-carriers, etc.), which are also commonly referred to as tones, bins, or the like. Each sub-carrier may be modulated with information (e.g., reference signals, control information, overhead information, user data, etc.). The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guardband) of 1.4, 3, 5, 10, 15, or 20 megahertz (MHz), respectively. The carrier bandwidth may also be partitioned into sub-bands. For example, a sub-band may cover 1.08 MHz, and a carrier may have 1, 2, 4, 8 or 16 sub-bands.

Wireless communications system 100 may support operation on multiple cells or carriers, a feature which may be referred to as carrier aggregation (CA) or multi-carrier operation. "The term 'component carrier' (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth and, e.g., higher data rates. CCs used in CA operation may be any suitable bandwidth (e.g., 1.4, 3, 5, 10, 15, or 20 megahertz (MHz), etc.), and each individual CC may provide the same capabilities as, for instance, a single carrier based on Release 8 or Release 9 of the LTE standard. Thus, individual CCs may be backwards compatible with legacy UEs 115 (e.g., UEs 115 implementing LTE Release 8 or Release 9); while also being utilized by other UEs 115 (e.g., UEs 115 implementing LTE versions after Release 8/9) configured for CA or in single carrier mode. Alternatively, a CC may be configured to be used in combination with other CCs and may not carry some channels used to support single carrier mode (e.g., format or control channels, etc.). CA may be used with both FDD and TDD component carriers.

In some embodiments of the system 100, base stations 105 and/or UEs 115 may include multiple antennas for employing antenna diversity schemes to improve communication quality and reliability between base stations 105 and UEs 115. For example, base stations 105 and/or UEs 115 may employ multiple-input, multiple-output (MIMO) techniques that may take advantage of multi-path environments to transmit multiple spatial layers carrying the same or different coded data. MIMO techniques include single-user MIMO (SU-MIMO) in which the same or different data streams are communicated on multiple layers between an eNB 105 and a single UE 115, and multiple-user MIMO (MU-MIMO) in which multiple streams may be transmitted to or received from spatially-distinguishable users. MU-MIMO may also be called spatial division multiple access (SDMA). Additionally or alternatively, transmissions to different UEs 115 may be differentiated by frequency (e.g., FDMA), spatial layer (e.g., SDMA), or non-orthogonal multiple access (NOMA) techniques. One NOMA technique that may be used is a power split between UEs 115, where the total transmit power for a set of resources is split between two UEs 115. In addition, transmission layers for MIMO or NOMA transmissions may be aligned (e.g., use the same resource blocks in the same transmission time interval(s)) or un-aligned. For downlink transmissions, the mode used for a transmission by the eNB 105 may be defined by a transmission strategy (TS). A TS for a downlink transmission may use one or more of these techniques for allocation of resources to UEs 115.

In LTE/LTE-A, channel state information (CSI) feedback allows downlink transmissions to be adaptively optimized based on the characteristics of the channel. Generally, the eNB 105 configures a UE 115 in a transmission mode (TM), which includes operation according to one or more spatial diversity techniques and defines a set of antenna ports for which the UE 115 performs measurements on reference signals (e.g., cell-specific reference signals (CRS), CSI reference signals (CSI-RS), UE-specific reference signals (UE-RS), etc.). The UE feeds back CSI in the form of recommended transmission formats, which may be TM dependent. CSI feedback may include rank indicator (RI), which indicates the number of layers recommended for transmissions, a precoding matrix indicator (PMI), which is an index of the recommended precoding matrix in a pre-defined precoding codebook corresponding to the RI, precoding type indicator (PTI) and channel quality indicator (CQI), which is an indication of the channel quality (e.g., signal-to-noise ratio (SNR)) corresponding to the reported RI/PMI. CQI may be defined as an index to a code rate and modulation order (e.g., QPSK, 16QAM, 64QAM, etc.), which may translate to a maximum transport block size that can be received by the UE 115 at a certain block error rate (BLER). UEs 115 can report CSI feedback periodically or aperiodically upon receiving a CSI request from the eNB 105. Thus, UEs 115 generally measure the downlink channels according to antenna ports defined by the TM, select a desired TS, and report CSI that corresponds to the desired TS. However, the eNB 105 may have many TSs to choose from for transmissions to multiple UEs 115 in a given transmission interval, and CSI reported from different UEs 115 may result in TSs selected by the UEs 115 that are not combinable.

In embodiments, the components of system 100 including the eNBs 105 and/or UEs 115 are configured for dual-thread feedback for non-orthogonal channels employing non-TS dependent feedback in a first feedback thread and TS-dependent feedback in a second feedback thread. As used herein, "non-orthogonal channels" includes channels of a carrier between a multiple-antenna transmitter and a multiple-antenna receiver for possible transmission layers including both orthogonal and non-orthogonal layers. For example, non-orthogonal channels for a carrier may include channels for transmission techniques such as SU-MIMO, MU-MIMO, and/or NOMA.

The first feedback thread may include channel feedback from channel measurements (e.g., channel gain, noise covariance, etc.) and may be fed back periodically. The eNB 105 may determine a TS space based on the channel feedback that includes combinable TSs for UEs 115 that may be grouped for transmissions and send one or more sets of TSs to the UEs 115. The UEs 115 may determine channel quality and/or other CSI for a subset of TSs of the one or more sets of TSs and thereafter feedback channel quality for one or more TSs of the TS sets. In some cases, the UEs 115 may select one or more TSs from each TS set and feedback channel quality for the selected TSs. The eNB 105 may perform scheduling of transmissions to the UEs 115 based on the channel feedback from the first feedback thread and/or the channel quality from the second feedback thread.

Figure 2:
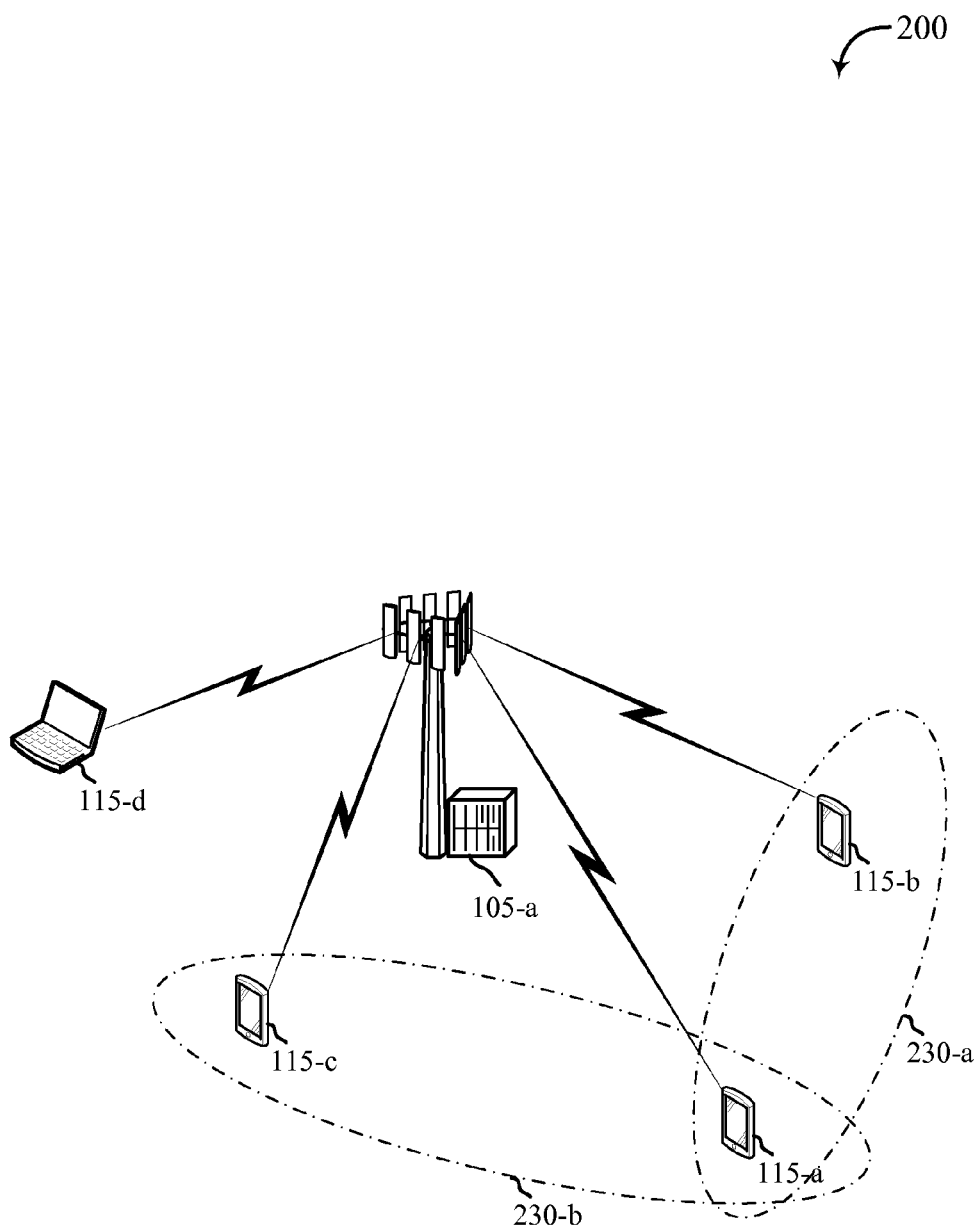
FIG. 2 shows an example wireless communications system that may employ dual-thread feedback for non-orthogonal channel scheduling in accordance with various aspects of the disclosure.

FIG. 2 shows an example wireless communications system 200 that may employ dual-thread feedback for channel scheduling in accordance with various aspects of the disclosure. In system 200, UEs 115-a, 115-b, 115-c, and 115-d may be connected to an eNB 105-a.

The eNB 105-a may configure transmitted resources for downlink transmissions to multiple UEs 115 in a number of ways. For example, the eNB 105-a may pair or group UEs 115-a and 115-b for a transmission as illustrated by UE group 230-a. Alternatively, the eNB 105-a may group UEs 115-a and 115-c for a transmission as illustrated by UE group 230-b. However, the eNB 105-a may not be able to determine how to optimize grouping of UEs from conventional CSI feedback. For example, CSI feedback from a UE associated with a spatial layer may reflect an assumption of precoding used for other spatial layers that may not be combinable with other feedback from other UEs to which the other spatial layers may be allocated.

In some cases, UE 115-a may feedback CSI indicating a rank 1 transmission using spatial layer 0 and precoding matrix A, while UE 115-b may feedback CSI indicating a rank 1 transmission using spatial layer 1 and precoding matrix A. In this case, because the TSs represented by the CSI feedback from UEs 115-a and 115-b are combinable, the eNB 105-a may be able to schedule UEs 115-a and 115-b according to their CSI feedback with resulting SNRs at the UEs 115-a and 115-b that are predicted by the CSI feedback. That is, the CSI feedback accurately predicts SNR for transmissions to UEs 115-a and 115-b using precoding matrix A for the data stream transmitted to UE 115-a on spatial layer 0 and using precoding matrix A for the data stream transmitted to UE 115-b on spatial layer 1, because the CSI feedback from UEs 115-a and 115-b was computed based on a compatible TS. For example, the CSI feedback from UE 115-a assumed a transmission with precoding matrix A applied to the stream intended for UE 115-b. Thus, the SNR feedback (e.g., CQI) from UE 115-a for the TS selected by UE 115-a will accurately reflect the interference seen by the presence of the other spatial layer transmitted according to the TS selected by UE 115-b.

However, in other cases UE 115-a and UE 115-b may feedback CSI that does not provide enough information for the eNB 105-a to accurately predict SNR for the spatial streams. For example, UE 115-a may feedback CSI indicating a rank 1 transmission using spatial layer 0 and precoding matrix A while UE 115-b may feedback CSI indicating a rank 1 transmission using spatial layer 1 and precoding matrix B. In this case, applying precoding matrix A to the stream for UE 115-a on spatial layer 0 and precoding matrix B to the stream for UE 115-b on spatial layer 1 may produce different interference effects (e.g., different SNR) at the UEs 115-a and 115-b and may result in degraded performance (e.g., increased BLER, etc.). In yet other cases, both UEs 115-a and 115-b may request the same spatial layer and the same or different precoding matrices, and the eNB 105-a may not be able to determine the appropriate assignment of spatial layers, precoding matrices, and CQI indexes for accurate prediction of BLER for the data streams.

One alternative scheme is to have UEs 115 feedback full channel measurement information so the eNB 105 can optimize scheduling for a carrier over the entire TS space. For example, UEs 115 may make channel measurements (e.g., channel gain, noise covariance, etc.) for the complete channel and feedback full channel measurement information to the eNB 105. In one example, the UEs may feedback the $N_T \times N_R$ channel matrix H and $N_T \times N_R$ noise covariance matrix $R_{NN}$. While receiving full channel measurement information from each UE 115 allows the eNB 105-a to compute SNRs across the TS space and optimize the selected TSs for served UEs, feedback of full channel measurement information requires a large amount of information to be fed back from UEs 115 to the eNB 105-a. In addition, channel measurement information may need to account for frequency selectivity. Thus, for feedback of full channel measurement information, the channel matrix H and noise covariance matrix $R_{NN}$ may need to be fed back for multiple sub-bands, which may result in loss of efficiency over the channel due to the large amount of feedback.

Figure 3:
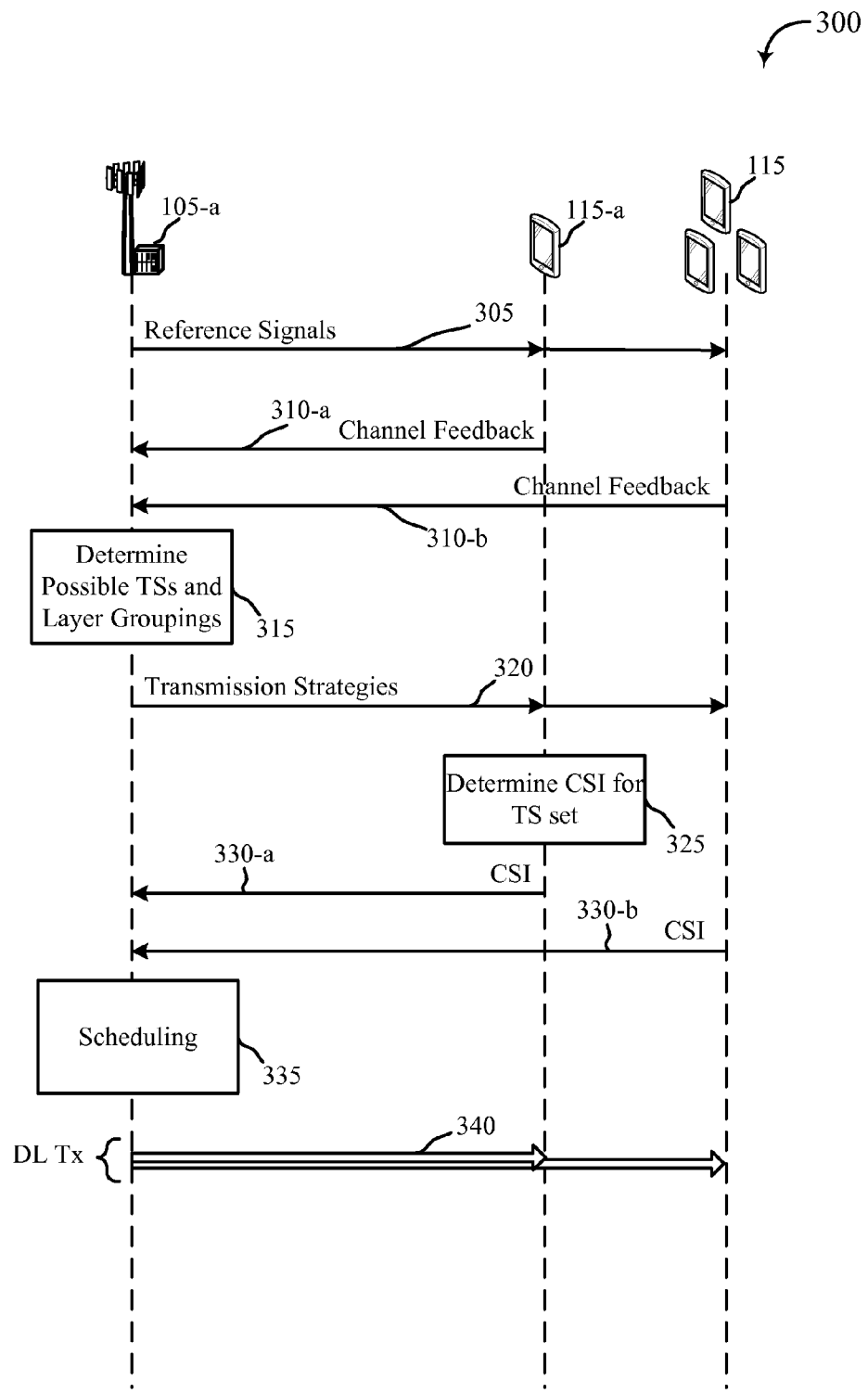
FIG. 3 illustrates an example message flow for dual-thread feedback in a wireless communications system in accordance with various aspects of the disclosure.

FIG. 3 illustrates an example message flow 300 for dual-thread feedback in a wireless communications system in accordance with various aspects of the disclosure. FIG. 3 illustrates dual-thread feedback for UE 115-a and other UEs 115, which may include, for example, UEs 115-b, 115-c, and 115-d as illustrated in system 200 of FIG. 2.

The eNB 105-a may transmit reference signals 305, which may include CRS, CSI-RS, and/or UE-RS and may include multiple reference signals of the same type transmitted from different antenna ports. The UE 115-a may perform channel measurements and provide channel feedback 310-a in a first feedback thread. In some embodiments, channel feedback 310-a provided in the first feedback thread may include channel measurement parameters determined from the channel matrix H and noise covariance matrix $R_{NN}$. For example, UE 115-a may compute the channel measurement matrix $M_P$ as:

$$M_P = P^H H^H R_{NN}^{-1} H P$$

Where:
P is the precoding matrix
H is the $N_T \times N_R$ channel matrix
$R_{NN}$ is the noise covariance matrix
and $X^H$ denotes a conjugate transpose of X.

Thus, the channel measurement matrix $M_P$ is an $N_T \times N_T$ Hermitian matrix. The UE 115-a may feedback a subset of the components of channel measurement matrix $M_P$. In some cases, the UE 115-a may feedback the diagonal elements (real values) and a set of complex values representing half of the non-diagonal elements (the other elements being complex conjugates of the set). For example, for a channel with 2 transmit antennas, UE 115-a may feedback 2 real values and one complex value. For a channel with 4 transmit antennas, UE 115-a may feedback 4 real values and 6 complex values.

The channel feedback 310-a sent from UE 115-a to eNB 105-a may be a quantized representation of components of the channel measurement matrix $M_P$. For example, UE 115-a may feedback a quantized channel measurement matrix $M_P$ or quantized element values of the channel measurement matrix $M_P$.

In some embodiments, the channel feedback 310 may be compressed in the time and/or frequency domains. For example, channel feedback 310 may include incremental values for elements of the channel measurement matrix $M_P$ for frequency regions (e.g., sub-bands, etc.) or for different reporting time periods (e.g., incremental values from previously reported values, etc.).

The precoding matrix P may be predetermined, and may be a default (e.g., identity matrix), in some cases. The eNB 105-a may determine the channel measurement matrix for different precoding matrices P by applying a basis transformation to the measurement matrix $M_P$. For example, where a channel measurement matrix $M_P$ is reported for a precoding matrix based on a basis $P=[P_0\ P_1]$, and a measurement for another basis $Q=[Q_0\ Q_1]$ is desired, where Q can be written as a linear combination of P, Q=PT, the channel measurement matrix $M_Q$ may be determined as $M_Q = T^H M_P T$.

The other UEs 115 served by eNB 105-a may also provide channel feedback 310-b. Channel feedback 310 may be provided by UEs 115 in periodic channel feedback reports. In some cases, channel feedback 310 may be multiplexed with uplink data transmissions (e.g., PUSCH, etc.) from UEs 115.

The eNB 105-a may use the channel feedback 310 provided by the first feedback thread to group UEs according to potential TSs for downlink transmissions at block 315. The eNB 105-a may send a TS set 320 to each UE 115 including potential TSs to be used for the downlink transmissions. The TS set 320 for each UE 115 may include multiple TSs that correspond with potential groupings of the UE 115 with different sets (e.g., pairings, groupings, etc.) of other UEs 115. UEs 115 grouped for a TS are assigned to at least partially overlapping resources (e.g., resource blocks, sub-bands, etc.) for a transmission time interval. For example, the eNB 105-a may determine a TS A that includes UE group 230-a for MU-MIMO and a TS B that includes UE group 230-b for MU-MIMO as illustrated in FIG. 2. TS A may include transmission of a first data stream to UE 115-a on a first spatial layer using precoding matrix $P_1$ and transmission of a second data stream to UE 115-b on a second spatial layer using precoding matrix $P_1$. TS B may include transmission of a first data stream to UE 115-a on a first spatial layer using precoding matrix $P_2$ and transmission of a second data stream to UE 115-c on a second spatial layer using precoding matrix $P_3$. Each TS in the TS sets may include selected resources (e.g., sub-band, etc.), rank, precoding matrix, power split, and whether interference cancellation (IC) is assumed for calculation of SNR.

The UEs 115 may receive the TS sets 320 and perform a second feedback thread that includes reporting CSI 330 for one or more of the TSs in the TS set 320. For example, UE 115-a may determine CSI for the TSs in TS set 320 at block 325 and may report CSI 330-a for one or more of the TSs of TS set 320. CSI 330-a may include, for example, RI, PMI, and/or CQI for the selected TSs. In some cases, the UE 115 may select the one or more TSs that provide the highest SNR. For example, the TS set 320 may include TS A and TS B and UE 115-a may report CSI 330 for TS A based on determining that SNR is higher under the parameters of TS A than for TS B. Similarly, the other UEs 115 may report CSI 330-b for one or more TSs of their respective TS sets 320.

Based on the received CSI 330 for TSs selected by the UEs 115, the eNB 105-a may perform scheduling 335 to optimize performance and/or efficiency. The eNB 105-a may then transmit DL Transmissions 340 to UEs 115 including UE 115-a based on the reported CSI 330. DL transmissions 340 may include SU transmissions (e.g., FDMA, SU-MIMO, etc.) and/or MU transmissions (e.g., NOMA, MU-MIMO, etc.).

Additionally or alternatively, the eNB 105-a may perform scheduling based on the first channel feedback thread. The eNB 105-a may compute minimum mean square error (MMSE) SNRs for various TSs from the channel feedback 310. For example, the MMSE SNR may be computed for rank 1 transmissions to UE A as follows:

$$SNR_A = \frac{\frac{2\alpha}{1-\alpha}\left(M_{PA,00} M_{PA,11} + \frac{2}{1-\alpha} M_{PA,00} - |M_{PA,01}|^2\right)}{\left(M_{PA,00} + \frac{2}{1-\alpha}\right)\left(M_{PA,11} + \frac{2}{1-\alpha}\right) - |M_{PA,01}|^2}$$

Where:
$M_{PA}$ is the $M_P$ matrix for UE A
$\alpha$ is a power split ratio
The MMSE SNR for rank 2 transmissions for UE B may be determined as follows:

$$SNR_{B,0} = \frac{1-\alpha}{2}\left[M_{PB,00} - \frac{|M_{PB,01}|^2}{\frac{2}{1-\alpha} + M_{PB,11}}\right],$$

$$SNR_{B,1} = \frac{1-\alpha}{2}\left[M_{PB,11} - \frac{|M_{PB,01}|^2}{\frac{2}{1-\alpha} + M_{PB,00}}\right]$$

Where:
$M_{PB}$ is the $M_P$ matrix for UE B
$\alpha$ is a power split ratio
The eNB 105-a may similarly determine SNRs with and without interference cancellation for UEs 115 based on the channel feedback 310.

The eNB 105-a may monitor feedback to determine if channel conditions have changed for UEs 115. For example, the eNB 105-a may monitor the channel quality from UEs 115 and may trigger an update (e.g., aperiodic request, etc.) of channel feedback 310 if channel conditions have changed (e.g., change in channel condition exceeds a threshold, etc.).

For ease of illustration, FIG. 3 illustrates channel feedback 310-a and 310-b for the first feedback thread occurring at the same time. However, it should be understood that the channel feedback 310 may be provided at different times from different UEs. For example, each UE 115 may be configured for periodic reporting of channel feedback 310 according to a periodic feedback schedule, and the transmission of channel feedback 310 may occur at different times. Similarly, sending of transmission strategies 320 to the UEs 115 and receiving of CSI 330 may also occur at different times for different UEs. Further, FIG. 3 illustrates an example of a DL transmission 340 based on channel feedback 310 and CSI 330. However, it should be understood that the eNB 105-a may continually schedule transmissions (e.g., for subsequent frames or sub-frames, etc.) based on additional channel feedback 310 and/or CSI 330.

Figure 4:
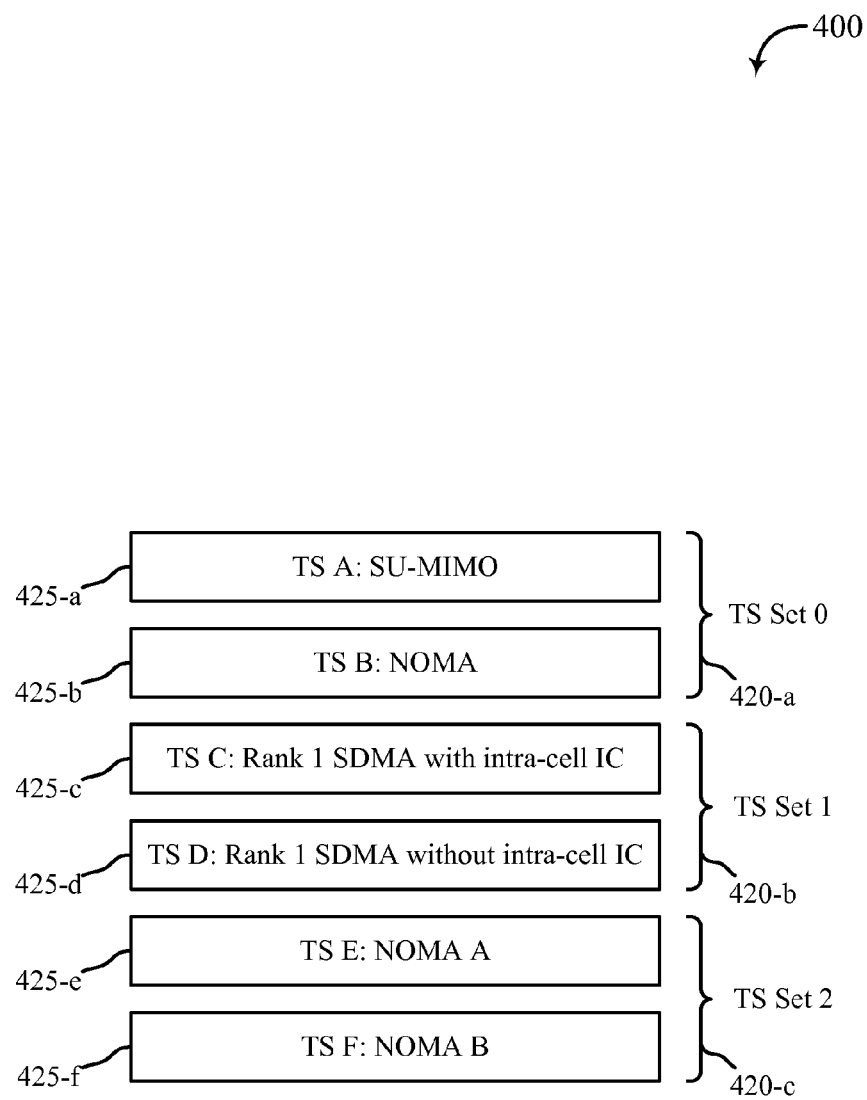
FIG. 4 illustrates a diagram of an example of multiple transmission strategy sets for dual-thread feedback in accordance with aspects of the present disclosure.

In some embodiments, the eNB 105-a may group TSs into multiple TS sets and the UE 115 may provide CSI feedback related to one or more TSs from each TS set. FIG. 4 illustrates a diagram 400 of an example of multiple TS sets received by a UE 115 for dual-thread feedback in accordance with aspects of the present disclosure. For example, TS set 320 as illustrated in FIG. 3 may include the TS Sets 420 of FIG. 4. The TSs may be grouped into TS Sets 420 by multiple access techniques, transmission modes, and/or type of CSI feedback.

In FIG. 4, the UE 115 may receive TS Set 0 420-a, which may include single user TSs (e.g., transmit diversity, closed loop spatial multiplexing, etc.) and multi-user TSs using NOMA techniques. For example, TS A 425-a may be a TS where the UE can operate in SU mode (e.g., rank 1, rank 2, etc.) and TS B 425-b may be a NOMA scheme where power is split between the UE 115 and a different UE 115. For TS Set 0 420-a, the UE 115 may select one or more TSs of TS set 0 for feedback and may feedback CSI reports including RI, PMI, and CQI for each TS for which feedback is provided.

TS Set 1 420-b may include TSs for rank 1 SDMA with and without data IC applied. For example, TS Set 1 420-b may include TS C 425-c and TS D 425-d, which may be rank 1 TSs using orthogonal spatial layers with and without IC, respectively. The UE 115 may select one or more TSs of TS set 1 420-b for feedback and may feedback CSI reports including PMI, and CQI for each TS for which feedback is provided.

TS set 2 420-c may include TSs for combinations of NOMA techniques. For example, TS Set 2 420-c may include TS E 425-e and TS F 425-f, which may be rank 1 or 2 for the UE 115, and may use NOMA techniques on one or both spatial layers to multiplex transmissions to a different UE 115. The UE 115 may select one or more TSs of TS Set 2 420-c for feedback and may feedback CSI reports including RI, PMI, and CQI for each TS for which feedback is provided.

Figure 5:
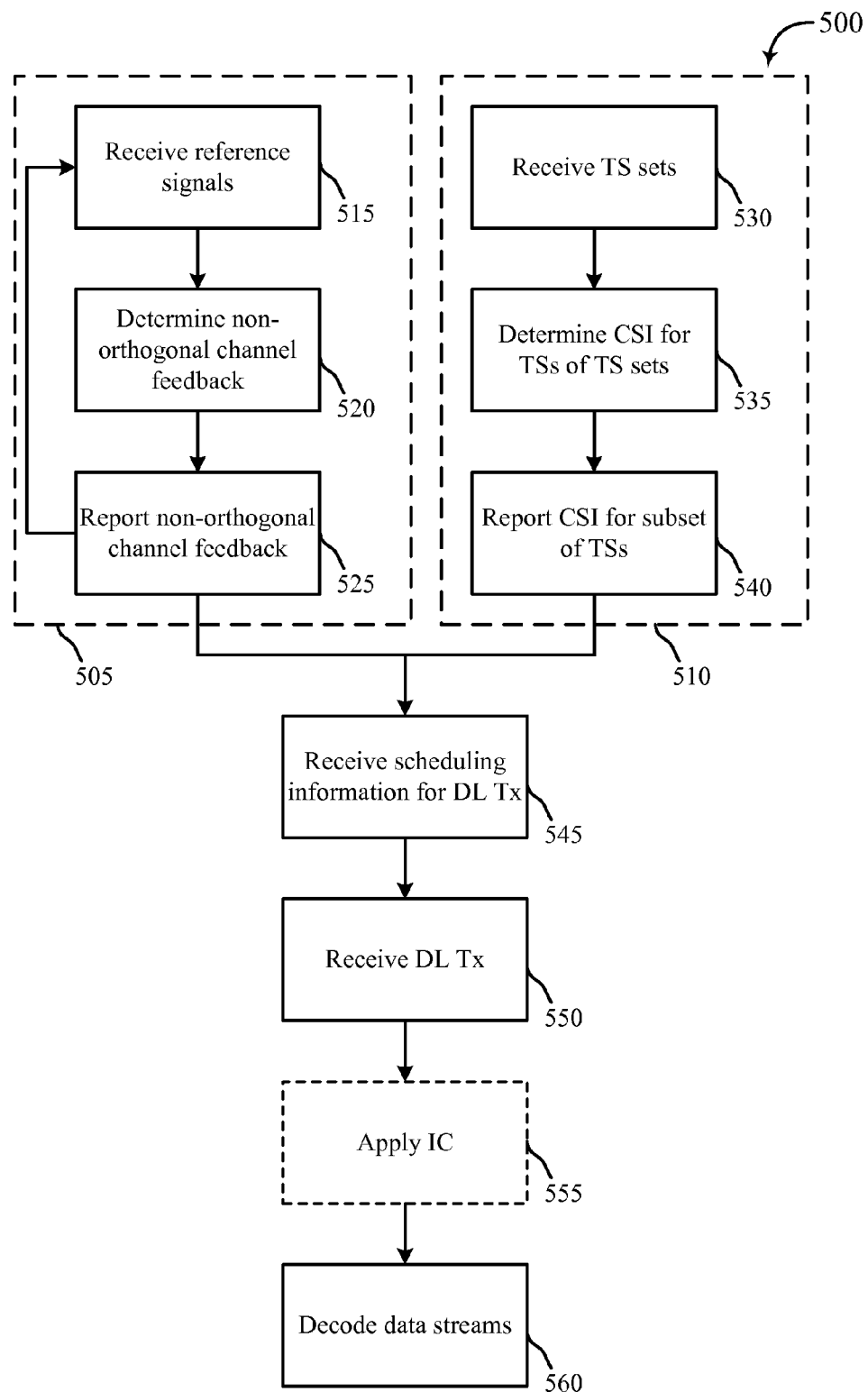
FIG. 5 shows a flow diagram of a method for dual-thread feedback for wireless communications in accordance with various aspects of the present disclosure.

FIG. 5 shows a flow diagram of a method 500 for dual-thread feedback for wireless communications in accordance with various aspects of the present disclosure. For clarity, the method 500 is described below with reference to aspects of one or more of the UEs 115 described with reference to FIG. 1, 2, 3, 9 or 13, and/or aspects of one or more of the devices described with reference to FIG. 7 or 8. In some examples, a UE 115 may execute one or more sets of codes to control the functional elements of the UE 115 to perform the functions described below. Additionally or alternatively, the UE 115 may perform one or more of the functions described below using special-purpose hardware.

Method 500 may include a first feedback thread 505 and a second feedback thread 510. In first feedback thread 505, the UE 115 may receive reference signals (e.g., CRS, CSI-RS, UE-RS, etc.) transmitted over a carrier from a serving eNB 105 at block 515. The reference signals received at block 515 may include reference signals transmitted over different antenna ports.

At block 520, the UE 115 may determine channel feedback to report for non-orthogonal channels of the carrier. For example, the UE 115 may measure a channel matrix H and a noise covariance matrix $R_{NN}$, and may determine a channel measurement matrix $M_P$ based on the channel matrix H and noise covariance matrix $R_{NN}$ as described above with reference to FIG. 3. The channel measurement matrix $M_P$ may be determined using a predetermined precoding matrix, or a default matrix (e.g., identity matrix).

At block 525, the UE 115 may report channel feedback for the carrier to the serving eNB 105. For example, the UE may perform periodic reporting of channel feedback at block 525. The channel feedback reported at block 525 may include elements of the channel measurement matrix $M_P$ (e.g., real values, a portion or all of the complex values, etc.). The reported channel feedback may be quantized (e.g., a quantized index to a channel measurement matrix codebook, or quantized element values of the channel measurement matrix $M_P$, etc.).

The second feedback thread may be initiated by receiving one or more TS sets at block 530. For example, the UE may receive multiple TS sets, where each TS set includes one or more TSs. The TSs may be grouped into the multiple TS sets by multiple access techniques and/or transmission modes. The second feedback thread may be initiated upon receipt of an aperiodic feedback request, and the aperiodic feedback request may include one or more TS sets for the requested CSI feedback.

At block 535, the UE 115 may determine partial or complete CSI feedback for the TSs of the TS sets. For example, the UE may determine RI, CQI, PTI, and/or PMI for the TSs. In some cases, TSs of the TS sets may indicate a multiple access technique (e.g., NOMA, SDMA, etc.), and the UE 115 may determine the CSI assuming an interfering stream on the same spatial layer or a different (e.g., orthogonal, etc.) spatial layer. The CQI for the TSs may be determined with intra-cell data IC and/or without intra-cell data IC, in some cases.

At block 540, the UE 115 may report partial or complete CSI for a subset of TSs of the TS sets. For example, the UE 115 may select one or more TSs from each TS set (e.g., TSs with the highest SNR, etc.) and report CSI for the selected TSs. In some cases, the CSI reporting at block 540 may be transmitted via a control channel (e.g., PUCCH, etc.) or a data channel (e.g., PUSCH, etc.).

At block 545, the UE 115 may receive scheduling information for a DL transmission. The DL transmission may be scheduled by the serving eNB 105-a based on the channel feedback of the first feedback thread 505, and/or based on the CSI reporting of the second feedback thread 510. For example, in some cases the serving eNB 105 may be able to accurately predict SNR of a DL transmission to multiple UEs 115 based on the channel feedback in the first feedback thread from the UEs 115 and may perform scheduling of transmissions without requesting further feedback using the second feedback thread. In other instances, the serving eNB 105 may determine UE groupings for transmissions and request CSI feedback for the TSs associated with the potential UE grouping using the second feedback thread.

At block 550, the UE 115 may receive the DL transmission from the serving eNB 105. The DL transmission may be received according to the CSI feedback sent at block 540. For example, the UE 115 may report CQI for a TS at block 540, and the DL transmission at block 550 may be received using the reported CQI for the selected TS.

In some instances, the UE 115 may apply IC to the received DL transmission at block 555. For example, the UE 115 may report CSI feedback at block 540 for a TS assuming data IC of a data transmission to another UE (e.g., different spatial layer, power split, etc.), and data IC may be applied at block 555 to cancel the interfering transmission to achieve the desired BLER at the reported CQI. At block 560, the UE 115 may decode data streams intended for the UE 115. The UE 115 may perform HARQ processes for the decoded data streams according to known techniques.

Figure 6:
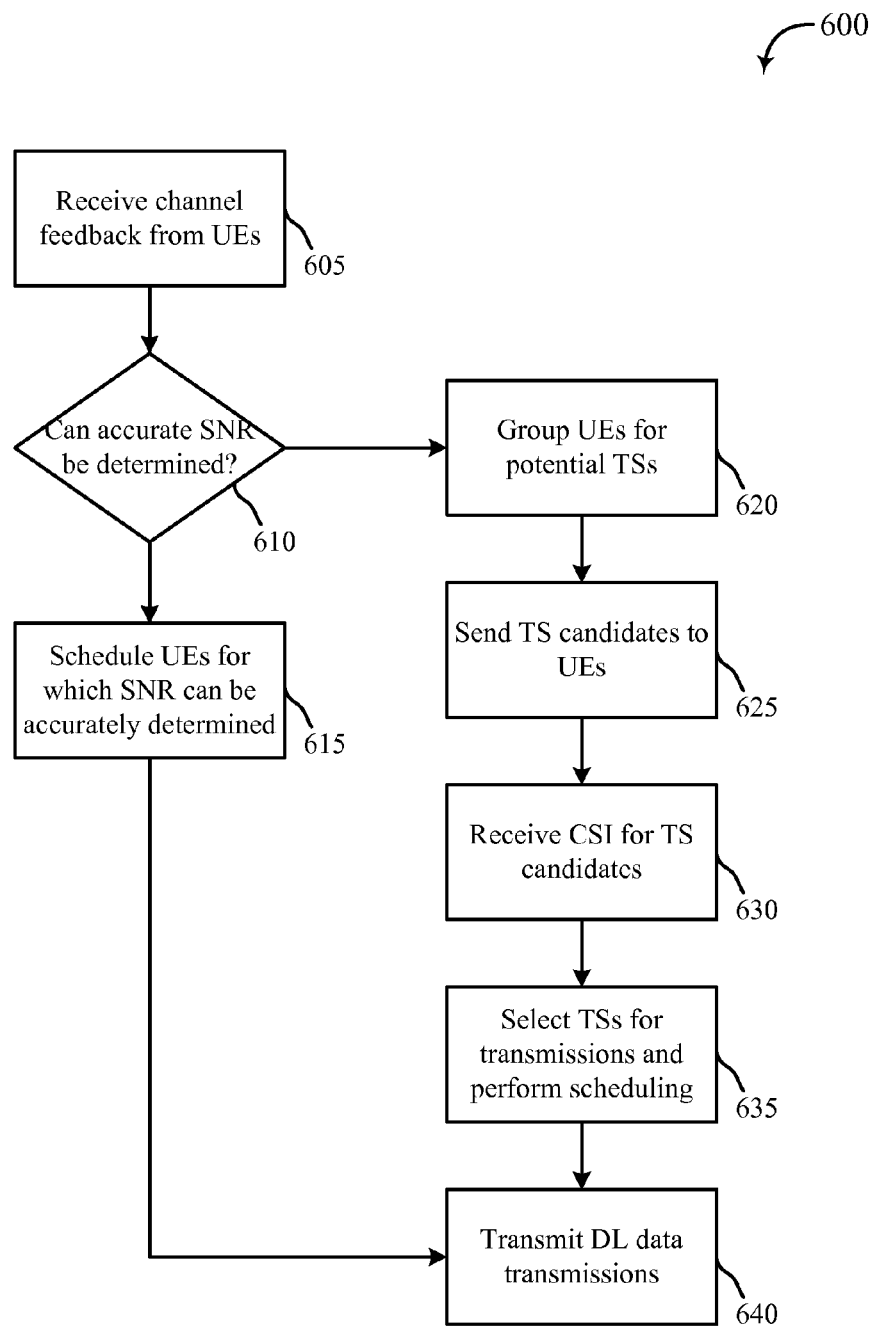
FIG. 6 shows a flow diagram of a method for dual-thread feedback for wireless communications in accordance with various aspects of the present disclosure

FIG. 6 shows a flow diagram of a method 600 for dual-thread feedback for wireless communications in accordance with various aspects of the present disclosure. For clarity, the method 600 is described below with reference to aspects of one or more of the eNBs 105 described with reference to FIGS. 1, 2, 3, and/or aspects of one or more of the devices described with reference to FIGS. 7, 8, 10, 11. In some examples, an eNB 105 may execute one or more sets of codes to control the functional elements of the eNB 105 to perform the functions described below. Additionally or alternatively, the eNB 105 may perform one or more of the functions described below using special-purpose hardware.

At block 605, the eNB 105 may receive channel feedback according to a first feedback thread for UEs 115 served by the eNB 105. The channel feedback from each UE 115 may be, for example, a channel measurement matrix $M_P$ or elements of the channel measurement matrix $M_P$. The channel feedback may be quantized (e.g., a quantized index to a channel measurement matrix codebook, or quantized element values of the channel measurement matrix $M_P$, etc.).

At block 610, the eNB 105 may determine if SNR for served UEs can be accurately determined from the channel feedback received in the first feedback thread. In some instances, the channel feedback received in the first feedback thread may provide enough information to determine potential TSs and groupings of UEs for TSs, but not to compute an accurate SNR for potential TSs. In addition, it may be beneficial to compare SNR computed from the first feedback thread with reported CSI for single-user TSs to optimize scheduling. Thus, where SNR for a set of UEs can be accurately determined and is complementary to potential TSs for other UEs, scheduling for the set of UEs may be performed by the eNB 105 at block 615 without requesting CSI feedback for particular TSs.

Additionally or alternatively, the eNB 105 may group UEs for TSs based on the channel feedback from the first feedback thread at block 620. The eNB 105 may split the TS space into multiple TS sets, which may improve the chance of finding TSs providing optimized UE groups. The potential TSs may be assembled into TS sets according to multiple access techniques (e.g., single user, NOMA, SDMA, etc.), transmission modes and/or type of CSI feedback.

At block 625, the eNB 105 may send the TS sets to the UEs 115. For example, the eNB 105 may send the TS sets in CSI feedback requests associated with a second feedback thread. The eNB 105 may send the TS sets in control information (e.g., DCI, MAC control elements, etc.) or appended to data.

At block 630, the eNB 105 may receive CSI for one or more TSs of the TS sets from the UEs 115 in the second feedback thread. The CSI feedback may include channel quality (e.g., CQI, etc.) for the one or more TSs. The CSI feedback may include RI, PMI and/or PTI, in some cases.

At block 635, the eNB 105 may select TSs from the TS sets based on the CSI reports received in the second feedback thread for transmissions to UEs 115 served by the eNB 105. The TS selection and scheduling at block 635 may also be based on the channel feedback from the first feedback thread received at block 605. For example, when UEs select incompatible TSs in the second feedback thread, the eNB may use the CSI provided in the second feedback thread and/or the channel feedback from the first feedback thread to perform TS selection and scheduling at block 635. Thus, the selected TSs for UEs 115 served by the eNB may include only TSs from the TS sets sent to the UEs 115 at block 625, or may include TSs not in the TS sets, in some cases.

At block 640, the UE may transmit downlink data transmissions to one or more served UEs according to the scheduling at blocks 615 and/or 635. The data transmissions may be transmitted according to one or more of the selected TSs and may be performed according to CSI received in the second feedback thread. For example, the channel quality received from UEs in the second feedback thread may be used for the data transmissions. The data transmissions may be signaled to the UEs 115 by associated control information.

Figure 7:
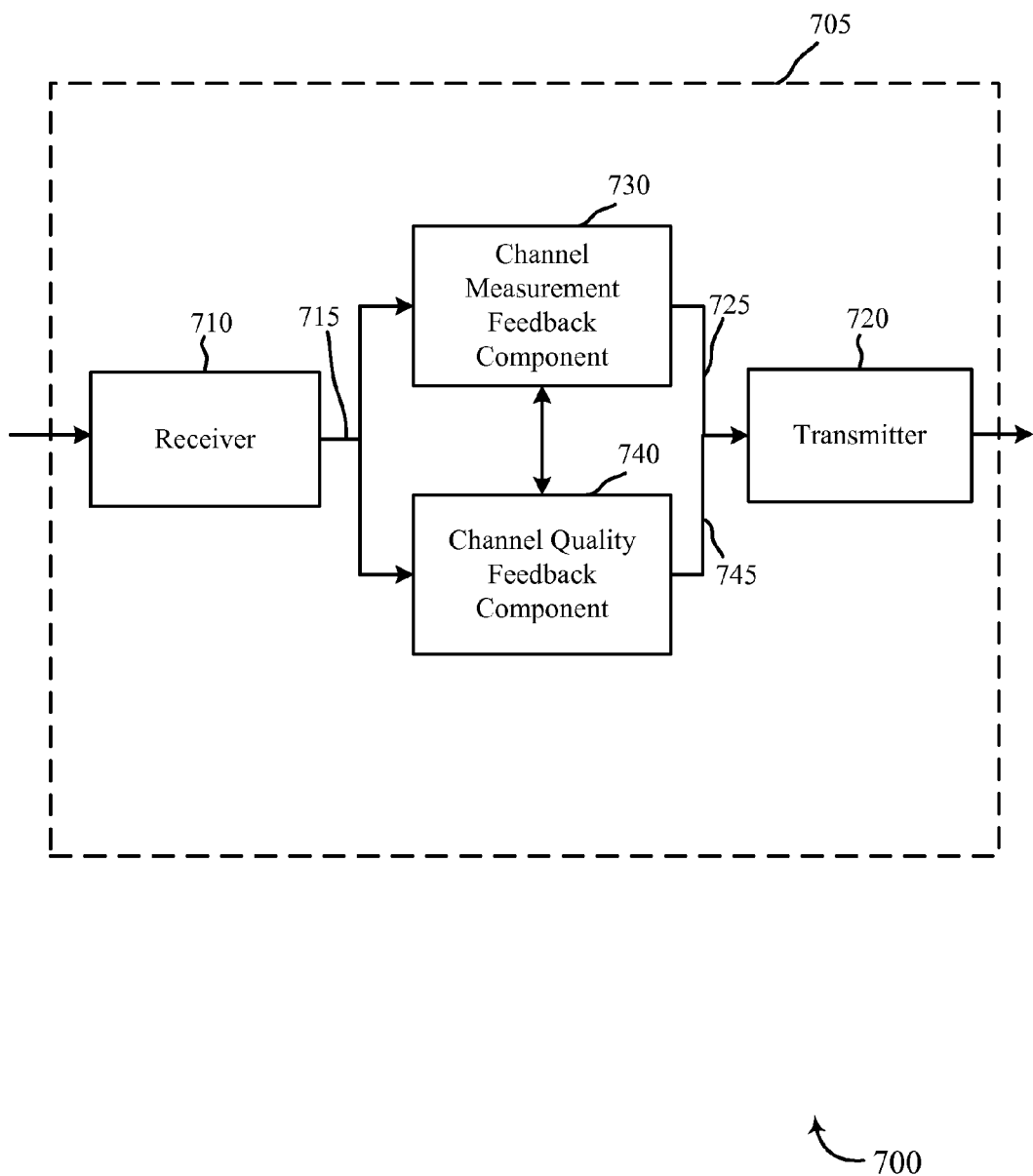
FIG. 7 shows a block diagram of a device configured for dual-thread feedback in wireless communication systems, in accordance with various aspects of the present disclosure.

FIG. 7 shows a block diagram 700 of a device 705 for dual-thread feedback in wireless communication systems, in accordance with various aspects of the present disclosure. The device 705 may be an example of one or more aspects of a UE 115 described with reference to FIGS. 1, 2, 3. The device 705 may include a receiver 710, a transmitter 720, a channel measurement feedback component 730, and a channel quality feedback component 740. The device 705 may also be or include a processor (not shown). Each of these components may be in communication with each other.

The receiver 710 may include at least one radio frequency (RF) receiver operable to receive information such as packets, user data, and/or control information associated with various signals (e.g., reference signals, etc.) and/or information channels (e.g., control channels, data channels, etc.). The receiver 710 may have multiple antennas and be configured to receive signals such as reference signals (e.g., CRS, CSI-RS, UE-RS, etc.) associated with various antenna ports, and compute channel measurements such as channel gains and noise covariance between spatial layers. The receiver 710 may pass the channel measurements 715 to the channel measurement feedback component 730.

The channel measurement feedback component 730 may be configured to process the channel measurements 715 and perform feedback reporting according to a first feedback thread. For example, the channel measurement feedback component 730 may determine a channel matrix H and a noise covariance matrix $R_{NN}$ from the channel measurements 715. The channel measurement feedback component 730 may determine a channel measurement matrix $M_P$ based on the channel matrix H and noise covariance matrix $R_{NN}$. The channel measurement matrix $M_P$ may be determined using a predetermined precoding matrix, or a default matrix (e.g., identity matrix). The channel measurement feedback component 730 may perform periodic reporting of channel feedback by passing channel feedback reports 725 to the transmitter 720. The transmitter 720 may transmit the channel feedback reports 725 to the serving eNB 105, and may multiplex the channel feedback reports 725 with data transmitted to the serving eNB 105. The channel feedback reported in channel feedback reports 725 may include elements of the channel measurement matrix $M_P$ (e.g., real values, a portion or all of the complex values, etc.). The reported channel feedback may be quantized (e.g., a quantized index to a channel measurement matrix codebook, or quantized element values of the channel measurement matrix $M_P$, etc.).

The channel quality feedback component 740 may perform processing for determining channel quality for a set of TSs received (e.g., via receiver 710) from the serving eNB 105. For example, the channel quality feedback component 740 may receive multiple TS sets, where each TS set includes one or more TSs. The TSs may be grouped into the multiple TS sets by multiple access techniques and/or transmission modes. The second feedback thread may be initiated upon receipt of an aperiodic feedback request, and the aperiodic feedback request may include one or more TS sets for the requested CSI feedback.

The channel quality feedback component 740 may receive channel measurements 715 from the receiver 710 and may determine CSI feedback for the TSs of the TS sets. For example, the channel quality feedback component 740 may determine RI, CQI, PTI, and/or PMI for the TSs. In some cases, TSs of the TS sets may indicate a multiple access technique (e.g., NOMA, SDMA, etc.), and the channel quality feedback component 740 may determine the CSI assuming an interfering stream on the same spatial layer or a different (e.g., orthogonal, etc.) spatial layer. The CQI for the TSs may be determined with intra-cell data IC and/or without intra-cell data IC, in some cases. The channel quality feedback component 740 may report CSI feedback for a subset of TSs of the TS sets by passing CSI feedback reports 745 to the transmitter 720. For example, the channel quality feedback component 740 may select one or more TSs from each TS set (e.g., TSs with the highest SNR, etc.) and report CSI for the selected TSs. In some cases, the transmitter 720 may transmit the CSI feedback reports 745 via a physical control channel (e.g., PUCCH, etc.)

The transmitter 720 may include at least one RF transmitter operable to transmit the one or more signals received from other components of the device 705 as described above. In some examples, the transmitter 720 may be collocated with the receiver 710 in a transceiver.

Figure 8:
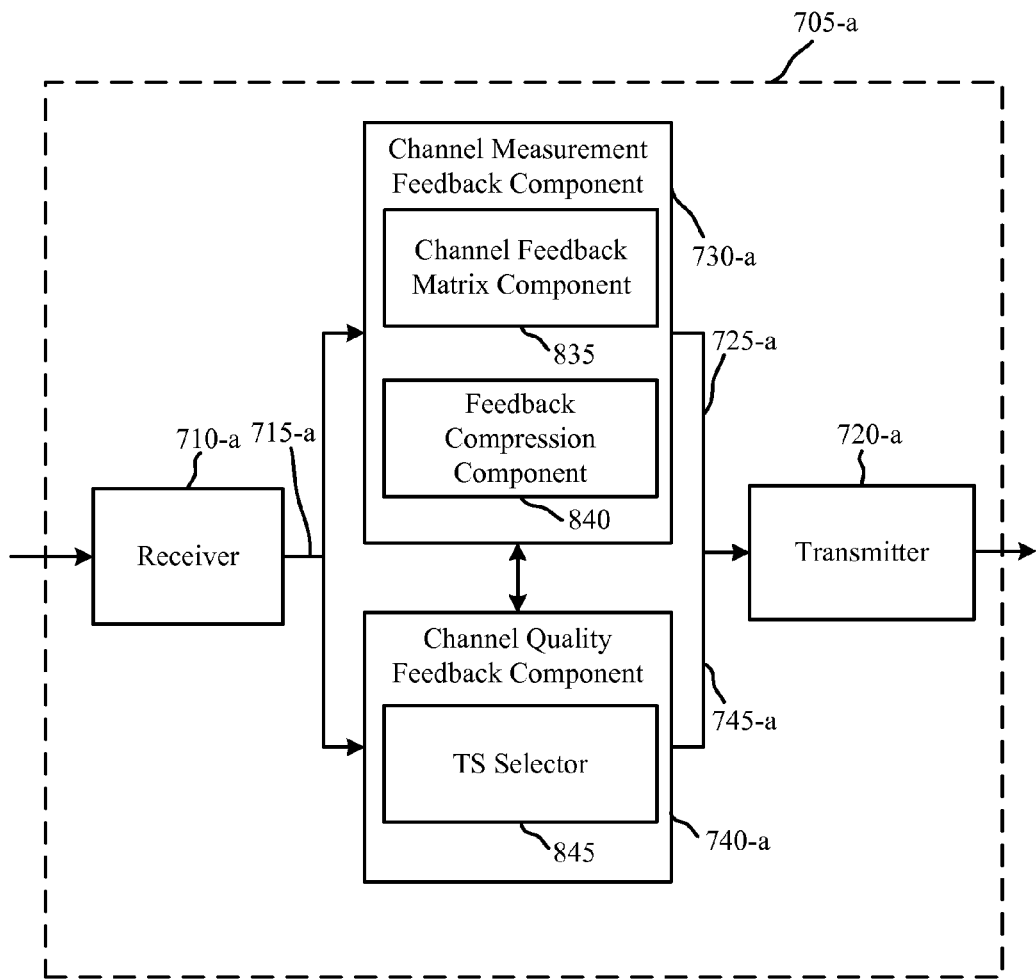
FIG. 8 shows a block diagram of a device configured for dual-thread feedback in wireless communication systems, in accordance with various aspects of the present disclosure.

FIG. 8 shows a block diagram 800 of a device 705-*a* for dual-thread feedback in wireless communication systems, in accordance with various aspects of the present disclosure. The device 705-*a* may be an example of one or more aspects of a UE 115 described with reference to FIG. 1, 2, 3, 9 or 13. It may also be an example of a device 705 described with reference to FIG. 7. The device 705-*a* may include a receiver 710-*a*, a transmitter 720-*a*, channel measurement feedback component 730-*a*, and a channel quality feedback component 740-*a*, which may be examples of the corresponding components of device 705. The device 705-*a* may also include a processor (not shown). Each of these components may be in communication with each other. The channel measurement feedback component 730-*a* may include a channel feedback matrix component 835 and/or a feedback compression component 840. The receiver 710-*a* and the transmitter 720-*a* may perform the functions of the receiver 710 and the transmitter 720, of FIG. 7, respectively. For example, the receiver 710-*a* may generate channel measurements 715-*a* from received signals (e.g., CRS, CSI-RS, UE-RS, etc.), which may be the channel measurements 715 of FIG. 7.

The channel feedback matrix component 835 may compute the channel measurement matrix $M_P$ based on the channel matrix H and noise covariance matrix $R_{NN}$ as described above. The channel measurement matrix $M_P$ may be determined using a predetermined precoding matrix, or a default matrix (e.g., identity matrix).

The feedback compression component 840 may perform compression on the channel feedback to be reported in the channel feedback reports 725-*a*. For example, the feedback compression component 840 may compress the channel feedback in the time and/or frequency domains. For example, the channel feedback reports 725-*a* may include incremental values for elements of the channel measurement matrix $M_P$ for frequency regions (e.g., sub-bands, etc.) or for different reporting time periods (e.g., incremental values from previously reported values, etc.).

The TS selector 845 may select TSs of the TS sets for the second feedback thread. For example, the TS selector 845 may select one or more TSs from each TS set to be reported in the second feedback thread. The TS selector 845 may select the one or more TSs that provide the highest SNR from each TS set.

The functions of the components of devices 705 of FIG. 7 or FIG. 8 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the devices 705 may, individually or collectively, be implemented in hardware (e.g., circuitry, etc.) using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 9:
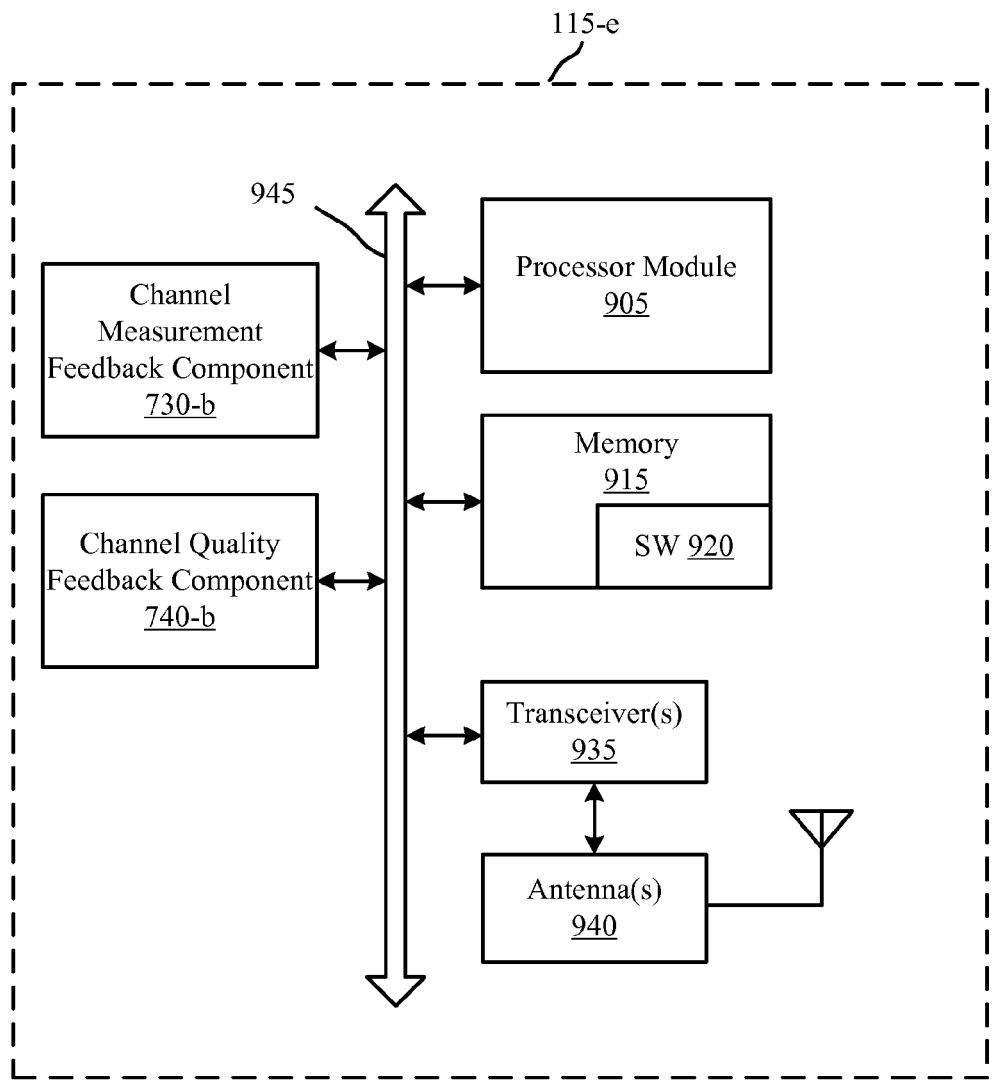
FIG. 9 shows a block diagram of a UE configured for dual-thread feedback in wireless communication systems, in accordance with various aspects of the present disclosure.

FIG. 9 shows a block diagram 900 of a UE 115-*e* configured for dual-thread feedback in wireless communication systems, in accordance with various aspects of the present disclosure. UE 115-*e* may be an example of the UEs 115 of FIG. 1, 2, 3 or 13. UE 115-*e* may also be an example of one or more aspects of devices 705 of FIGS. 7 and 8.

The UE 115-*e* may generally include components for bi-directional voice and data communications including components for transmitting communications and components for receiving communications. The UE 115-*e* may include antenna(s) 940, transceiver(s) 935, processor(s) 905, and memory 915 (including software (SW) 920), which each may communicate, directly or indirectly, with each other (e.g., via one or more buses 945). The transceiver(s) 935 may be configured to communicate bi-directionally, via the antenna(s) 940 and/or one or more wired or wireless links, with one or more networks, as described above. For example, the transceiver(s) 935 may be configured to communicate bi-directionally with base stations 105 and/or other UEs 115. The transceiver(s) 935 may include a modem configured to modulate the packets and provide the modulated packets to the antenna(s) 940 for transmission, and to demodulate packets received from the antenna(s) 940. The UE 115-*e* may have multiple antennas 940 capable of concurrently transmitting and/or receiving multiple wireless transmissions (e.g., MIMO transmissions, NOMA transmissions, etc.). The transceiver(s) 935 may be capable of concurrently communicating with one or more base stations 105 via multiple component carriers.

The UE 115-*e* may include a channel measurement feedback component 730-*b*, and a channel quality feedback component 740-*b*, which may be configured to perform and/or control some or all of the features and/or functions described above with reference to FIGS. 7 and 8 related to providing channel information in a first feedback thread, receiving TS sets, and providing channel quality feedback in a second feedback thread for one or more TSs of the TS sets. In some examples, channel measurement feedback component 730-*b* and channel quality feedback component 740-*b* may be part of the software/firmware code 920 and may include instructions that are configured to cause the processor(s) 905 to perform various functions described herein (e.g., determining a channel measurement matrix, quantizing feedback information, providing periodic channel information reports, receiving channel quality requests, receiving TS sets, providing channel quality feedback for a subset of TSs, etc.). The channel measurement feedback component 730-*b* and a channel quality feedback component 740-*b* may be examples of the channel measurement feedback components 730 and channel quality feedback components 740 described with reference to FIGS. 7 and 8.

The memory 915 may include random access memory (RAM) and read-only memory (ROM). The memory 915 may store computer-readable, computer-executable software/firmware code 920 containing instructions that are configured to, when executed, cause the processor(s) 905 to perform various functions described herein. Alternatively, the computer-readable, computer-executable software/firmware code 920 may not be directly executable by the processor(s) 905 but be configured to cause a computer (e.g., when compiled and executed) to perform functions described herein. The processor(s) 905 may include an intelligent hardware device, e.g., a central processing unit (CPU), a microcontroller, an application-specific integrated circuit (ASIC), etc.

Figure 10:
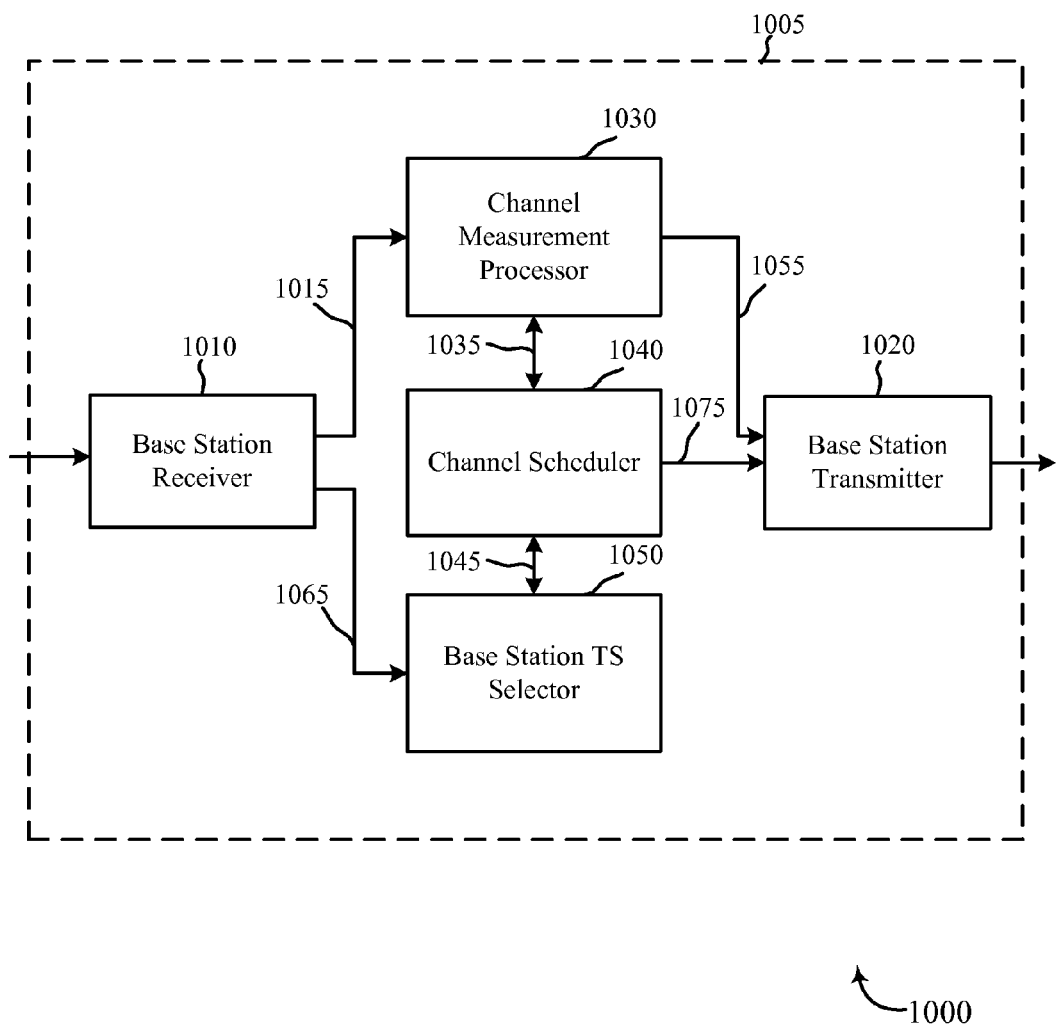
FIG. 10 shows a block diagram of a device configured for dual-thread feedback in wireless communication systems, in accordance with various aspects of the present disclosure.

FIG. 10 shows a block diagram 1000 of a device 1005 configured for dual-thread feedback in wireless communication systems, in accordance with various aspects of the present disclosure. In some examples, the device 1005 may be an example of aspects of one or more of the base stations 105 described with reference to FIG. 1, 2, 3, 12 or 13. In some examples, the device 1005 may be part or include an LTE/LTE-A eNB and/or an LTE/LTE-A base station. The device 1005 may also be a processor. The device 1005 may include a base station receiver 1010, a base station transmitter 1020, a channel measurement processor 1030, a channel scheduler 1040, and/or a base station TS selector 1050. Each of these components may be in communication with each other.

In some examples, the base station receiver 1010 may include at least one RF receiver operable to receive feedback from UEs including channel feedback in a first feedback thread and channel quality in a second feedback thread. The base station receiver 1010 may be used to receive various types of data and/or control signals (e.g., transmissions) over one or more communication links of a wireless communication system, such as the wireless communications systems 100 and 200 described with reference to FIG. 1 or 2.

In some examples, the base station transmitter 1020 may include at least one RF transmitter operable to transmit concurrent data transmissions to multiple UEs 115 according to the various multiple access techniques (e.g., single-user, transmit diversity, SDMA, NOMA, etc.). The base station transmitter 1020 may be used to transmit various types of reference signals, control signaling, and/or data transmissions over one or more communication links of a wireless communication system, such as the wireless communications systems 100 and 200 described with reference to FIG. 1 or 2.

In some examples, the channel measurement processor 1030 may receive channel feedback 1015 (e.g., via base station receiver 1010) according to a first feedback thread for UEs 115 served by the device 1005. The channel feedback 1015 from each UE 115 include, for example, a channel measurement matrix $M_P$ or elements of the channel measurement matrix $M_P$. The channel feedback may be quantized (e.g., a quantized index to a channel measurement matrix codebook, or quantized element values of the channel measurement matrix $M_P$, etc.). The channel measurement processor 1030 may determine if SNR for served UEs can be accurately determined from the channel feedback 1015 received in the first feedback thread. If the SNR for served UEs 115 can be accurately determined, the channel measurement processor 1030 may pass the SNR information 1035 to the channel scheduler 1040, which may perform scheduling for the UEs.

Alternatively, the channel measurement processor 1030 may group UEs for TSs based on the channel feedback from the first feedback thread. The channel measurement processor 1030 may send the TS sets to the UEs 115. For example, the channel measurement processor 1030 may provide the TS sets 1055 to the base station transmitter 1020, which may send the TS sets to the UEs 115 in CSI feedback requests associated with a second feedback thread. The base station transmitter 1020 may send the TS sets in control information (e.g., DCI, MAC control elements, etc.) or appended to data.

The base station TS selector 1050 may receive CSI 1065 for one or more TSs of the TS sets in the second feedback thread (e.g., via base station receiver 1010). The CSI 1065 may include channel quality (e.g., CQI, etc.) for the one or more TSs. The CSI 1065 may include RI, PMI and/or PTI, in some cases. The base station TS selector 1050 may select TSs from the TS sets based on the CSI received in the second feedback thread for transmissions to UEs 115. Additionally or alternatively, the base station TS selector 1050 may select TSs not in the TS sets for some UEs (e.g., TSs for some UEs may selected based on the channel feedback 1015, etc.). The base station TS selector 1050 may pass the TS selection information 1045 to the channel scheduler 1040, which may schedule DL data transmissions to served UEs 115 and provide scheduling information 1075 to the base station transmitter 1020 for transmission of data streams to the UEs 115 according to the scheduling information 1075. The base station TS selector 1050 may monitor CSI 1065 to determine if channel conditions have changed to UEs 115. For example, the base station TS selector 1050 may monitor the channel quality from UEs 115 and may trigger an update (e.g., aperiodic request, etc.) of channel feedback 1015 if channel conditions have changed (e.g., change in channel condition exceeds a threshold, etc.).

Figure 11:
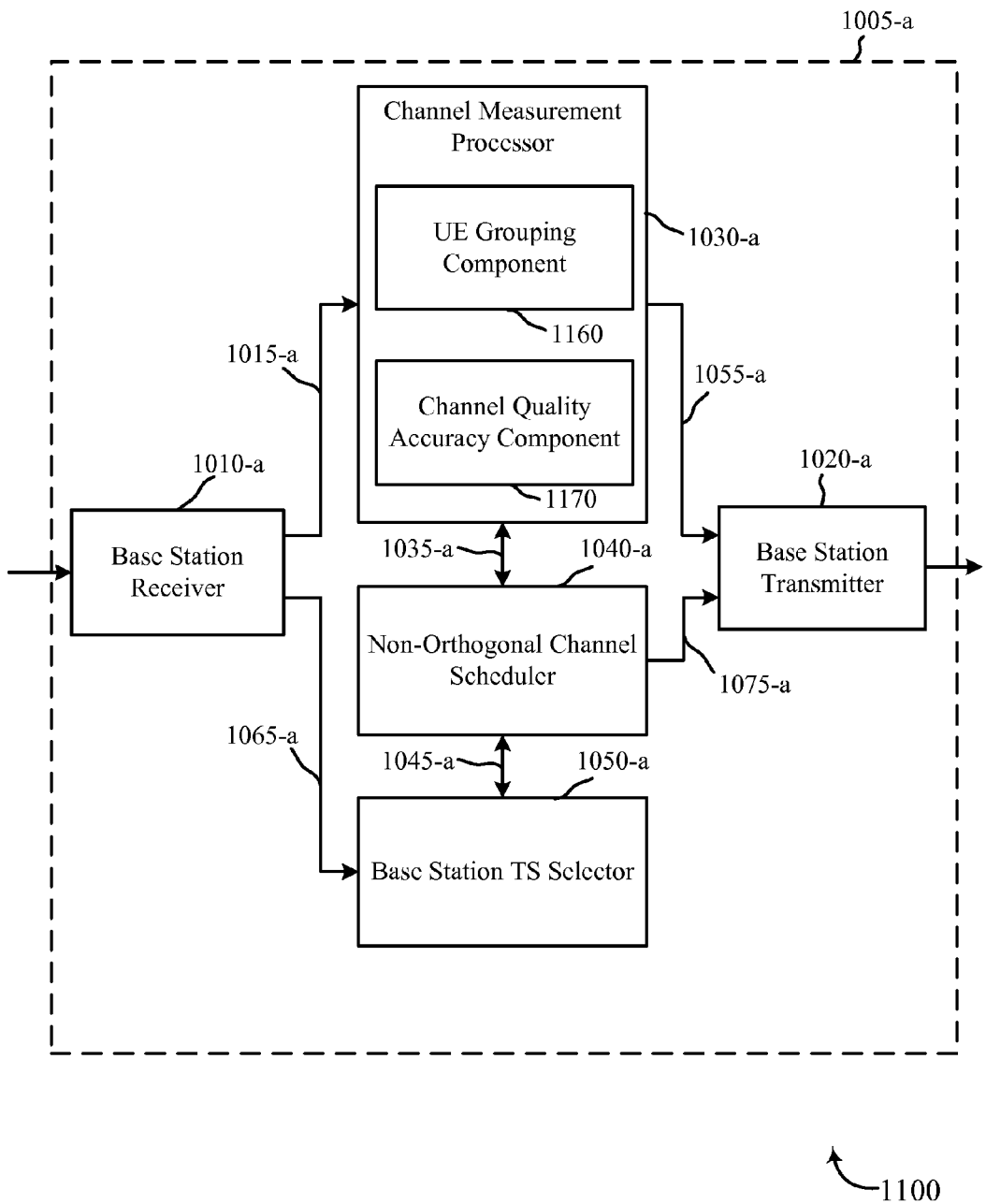
FIG. 11 shows a block diagram of a device configured for dual-thread feedback in wireless communication systems, in accordance with various aspects of the present disclosure.

FIG. 11 shows a block diagram 1100 of a device 1005-*a* configured for dual-thread feedback in wireless communication systems, in accordance with various aspects of the present disclosure. In some examples, the device 1005-*a* may be an example of aspects of one or more of the base stations 105 described with reference to FIG. 1, 2, 3, 12 or 13, and/or an example of aspects of the device 1005 described with reference to FIG. 10. In some examples, the device 1005-*a* may be part of or include an LTE/LTE-A eNB and/or an LTE/LTE-A base station (e.g., eNB). The device 1005-*a* may also be a processor. The device 1005-*a* may include a base station receiver 1010-*a*, a base station transmitter 1020-*a*, a channel measurement processor 1030-*a*, a channel scheduler 1040-*a*, and/or a base station TS selector 1050-*a*. Each of these components may be in communication with each other.

In some examples, the base station receiver 1010-*a* may be an example of one or more aspects of the base station receiver 1010 described with reference to FIG. 10. In some examples, the base station transmitter 1020-*a* may be an example of one or more aspects of the base station transmitter 1020 described with reference to FIG. 10. For example, the base station receiver 1010-*a* may pass channel feedback 1015-*a* to the channel measurement processor 1030-*a*, and may pass CSI 1065-*a* for one or more TSs of the TS sets in the second feedback thread to the base station TS selector 1050-*a*.

The channel measurement processor 1030-*a*, channel scheduler 1040-*a*, and base station TS selector 1050-*a* may be examples of the measurement processor 1030, channel scheduler 1040, and base station TS selector 1050 of FIG. 10, respectively, and may perform the corresponding functions described above. For example, the base station TS selector 1050-*a* may receive CSI 1065-*a* for one or more TSs of the TS sets in the second feedback thread, select TSs from the TS sets for scheduling, and pass the TS selection information 1045-*a* to the channel scheduler 1040-*a*, which may schedule DL data transmissions to served UEs and provide scheduling information 1075-*a* to the base station transmitter 1020-*a* for transmission of data streams to the UEs 115 according to the scheduling information 1075-*a*.

The UE grouping component 1160 may group TSs into TS sets. For example, the UE grouping component 1160 may split the TS space into multiple TS sets, which may improve the chance of finding TSs providing optimized UE groups. The potential TSs may be assembled into TS sets according to multiple access techniques (e.g., single user, NOMA, SDMA, etc.), transmission modes and/or type of CSI feedback.

The channel quality accuracy component 1170 may determine if SNR for served UEs can be accurately determined from the channel feedback received in the first feedback thread. Where the channel quality accuracy component 1170 determines that SNR for a set of UEs can be accurately determined and is complementary to potential TSs for other UEs, the channel measurement processor 1030-*a* may pass the SNR information 1035-*a* to the base station TS selector 1050-*a* and/or channel scheduler 1040-*a*, which may perform TS selection and scheduling for the UEs.

The functions of the components of devices 1005 of FIG. 10 or FIG. 11 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the devices 1005 may, individually or collectively, be implemented in hardware (e.g., circuitry, etc.) using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 12:
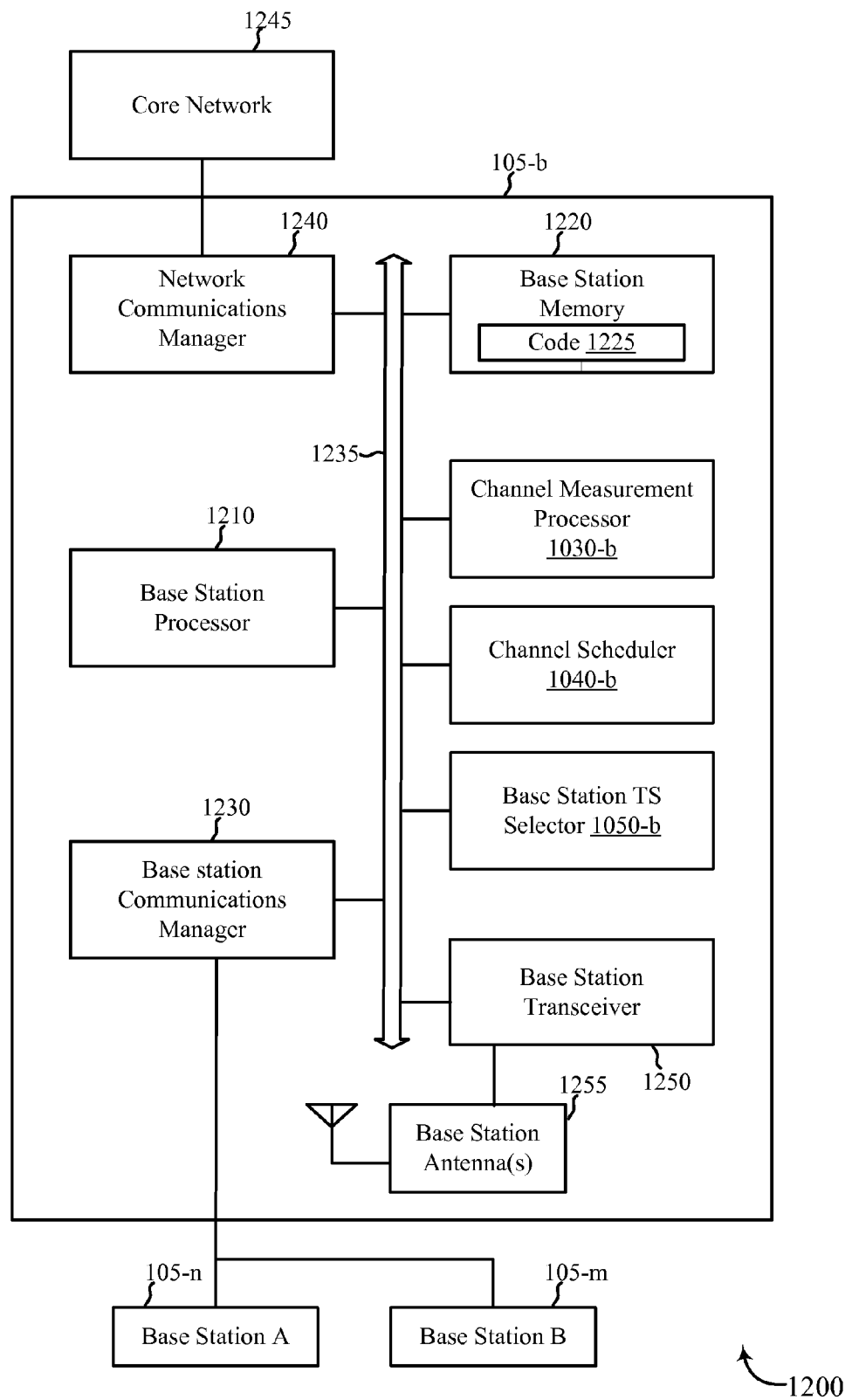
FIG. 12 shows a block diagram of a base station configured for dual-thread feedback in a wireless communication system, in accordance with various aspects of the present disclosure.

FIG. 12 shows a block diagram 1200 of a base station 105-*b* (e.g., a base station forming part or all of an eNB) configured for dual-thread feedback in a wireless communication system, in accordance with various aspects of the present disclosure. In some examples, the base station 105-*b* may be an example of aspects of one or more of the base stations 105 described with reference to FIG. 1, 2, 3 or 13, and/or aspects of one or more of the apparatus 1005 when configured as a base station, as described with reference to FIGS. 10 and/or 11. The base station 105-*b* may be configured to implement or facilitate at least some of the base station and/or apparatus features and functions described with reference to FIGS. 1-4 and 6.

The base station 105-*b* may include a base station processor 1210, base station memory 1220 (including software/firmware 1225), base station transceiver(s) 1250, and base station antenna(s) 1255. The base station 105-*a* may also include one or more of a base station communications manager 1230 and/or a network communications manager 1240. Each of these components may be in communication with each other, directly or indirectly, over one or more buses 1235.

The base station 105-*b* may include a channel measurement processor 1030-*b*, a channel scheduler 1040-*b*, and/or a base station TS selector 1050-*b*, which may be configured to perform and/or control some or all of the features and/or functions described above with reference to FIGS. 10 and 11 related to receiving channel feedback in a first feedback thread, determining if accurate SNR can be determined from the channel feedback, grouping UEs in TSs, determining and sending TS sets, receiving channel quality in a second feedback thread, and scheduling UEs for transmissions. In some examples, channel measurement processor 1030-*b*, channel scheduler 1040-*b*, and/or base station TS selector 1050-*b* may be part of the software/firmware code 1225 and may include instructions that are configured to cause the base station processor 1210 to perform various functions described herein. The channel measurement processor 1030-*b*, channel scheduler 1040-*b*, and/or base station TS selector 1050-*b* may be examples of channel measurement processor 1030, channel scheduler 1040, and base station TS selector 1050 described with reference to FIGS. 10 and 11, respectively.

The base station memory 1220 may include random access memory (RAM) and/or read-only memory (ROM). The base station memory 1220 may store computer-readable, computer-executable software/firmware code 1225 containing instructions that are configured to, when executed, cause the base station processor 1210 to perform various functions described herein. Alternatively, the computer-readable, computer-executable software/firmware code 1225 may not be directly executable by the base station processor 1210 but be configured to cause the base station 105-*b* (e.g., when compiled and executed) to perform various of the functions described herein.

The base station processor 1210 may include an intelligent hardware device, e.g., a central processing unit (CPU), a microcontroller, an ASIC, etc. The base station processor 1210 may process information received through the base station transceiver(s) 1250, the base station communications manager 1230, and/or the network communications manager 1240. The base station processor 1210 may also process information to be sent to the transceiver(s) 1250 for transmission through the antenna(s) 1255, to the base station communications manager 1230, for transmission to one or more other base stations 105-*b* and 105-*c*, and/or to the network communications manager 1240 for transmission to a core network 1245, which may be an example of one or more aspects of the core network 130 described with reference to FIG. 1.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more base station transmitters and one or more separate base station receivers. The base station transceiver(s) 1250 may be configured to communicate bi-directionally, via the antenna(s) 1255, with one or more UEs or apparatuses, such as one or more of the UEs 115 described with reference to FIG. 1, 2, 3, 9 or 13. The base station 105-*b* may, for example, include multiple base station antennas 1255 (e.g., an antenna array). The base station 105-*b* may communicate with the core network 1245 through the network communications manager 1240. The base station 105-*b* may also communicate with other base stations, such as the base stations 105-*n* and 105-*m*, using the base station communications manager 1230.

Figure 13:
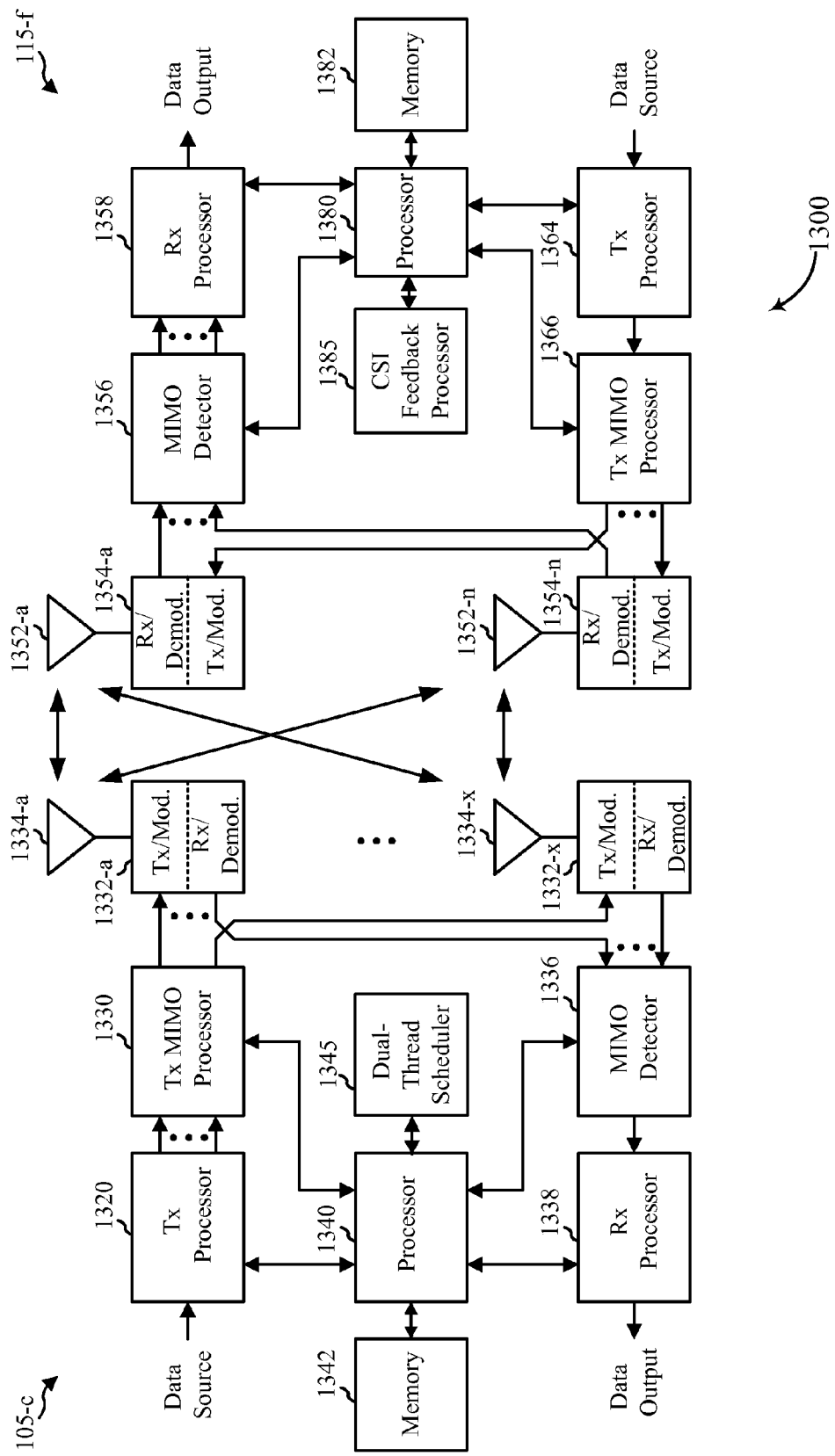
FIG. 13 shows a block diagram of an example multiple-input/multiple-output communication system, in accordance with various aspects of the present disclosure.

FIG. 13 is a block diagram of an example multiple antenna communication system 1300 including a base station 105-*c* and a UE 115-*f*. The multiple antenna communication system 1300 may illustrate aspects of the wireless communications systems 100 or 200 shown in FIG. 1 or 2. The base station 105-*c* may be equipped with antennas 1334-*a* through 1334-*x*, and the UE 115-*f* may be equipped with antennas 1352-*a* through 1352-*n*. In the communications system 1300, the base station 105-*c* may be able to send data over multiple communication links at the same time. Each communication link may be called a "layer" and the "rank" of the communication link may indicate the number of layers used for communication. For example, in a 2×2 MIMO communications system where base station 105-*c* transmits two "layers," the rank of the communication link between the base station 105-*c* and the UE 115-*f* is two.

At the base station 105-*c*, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the transmit modulators 1332-*a* through 1332-*x*. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a DL signal. In one example, DL signals from modulators 1332-*a* through 1332-*x* may be transmitted via the antennas 1334-*a* through 1334-*x*, respectively.

At the UE 115-*f*, the UE antennas 1352-*a* through 1352-*n* may receive the DL signals from the base station 105-*d* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*f* to a data output, and provide decoded control information to a processor 1380, or memory 1382.

The processor 1380 may in some cases execute stored instructions to instantiate a CSI feedback processor 1385. The CSI feedback processor 1385 may perform the functions of the components of FIGS. 7 and 8 related to providing channel feedback in a first feedback thread, receiving TS sets, and providing channel quality in a second feedback thread for one or more TSs of the TS sets. For example, the CSI feedback processor 1385 may be an example of aspects of the channel measurement feedback components 730 and channel quality feedback components 740 described with reference to FIGS. 7, 8 and/or 9.

On the uplink (UL), at the UE 115-*f*, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulators 1354-*a* through 1354-*n* (e.g., for SC-FDMA, etc.), and be transmitted to the base station 105-*c* in accordance with the transmission parameters received from the base station 105-*c*. At the base station 105-*c*, the UL signals from the UE 115-*f* may be received by the antennas 1334, processed by the demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a dual-thread scheduler 1345 which may be configured to perform the functions described above related to receiving channel feedback in a first feedback thread, determining if accurate SNR can be determined from the channel feedback, grouping UEs in TSs, determining and sending TS sets, receiving channel quality feedback in a second feedback thread, and scheduling multiple UEs for transmissions. The dual-thread scheduler 1345 may be an example of aspects of the channel measurement processors 1030, channel schedulers 1040, and/or base station TS selectors 1050 described with reference to FIGS. 10, 11 and/or 12.

The components of the UE 115-*f* may, individually or collectively, be implemented with one or more ASICs adapted to perform some or all of the applicable functions in hardware. Each of the noted components may be a means for performing one or more functions related to operation of the communications system 1300. Similarly, the components of the base station 105-*c* may, individually or collectively, be implemented with one or more ASICs adapted to perform some or all of the applicable functions in hardware. Each of the noted components may be a means for performing one or more functions related to operation of the communications system 1300.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
    reporting channel feedback for non-orthogonal channels of a carrier to a base station;
    receiving, in response to the reported channel feedback, a plurality of potential transmission strategies for downlink transmissions from the base station over the carrier;
    reporting channel quality for at least one transmission strategy of the plurality of potential transmission strategies to the base station; and
    receiving a downlink transmission from the base station over one or more of the non-orthogonal channels according to a transmission strategy selected from the at least one transmission strategy.

2. The method of claim 1, further comprising:
    determining a channel feedback matrix based on a channel matrix and a noise covariance matrix for the non-orthogonal channels,
    wherein the reporting the channel feedback comprises reporting at least one component of the channel feedback matrix.

3. The method of claim 2, wherein the channel feedback matrix is further determined based on a precoding matrix.

4. The method of claim 3, wherein the precoding matrix comprises a default precoding matrix for the non-orthogonal channels.

5. The method of claim 2, further comprising:
    compressing reported values for the at least one component of the channel feedback matrix according to a frequency domain correlation, a time domain correlation, or a combination thereof.

6. The method of claim 1, wherein a first transmission strategy of the plurality of potential transmission strategies comprises a first data transmission for the UE and a second data transmission for a different UE.

7. The method of claim 6, further comprising:
    determining the channel quality for the first transmission strategy based on an estimate of channel quality for the first data transmission subject to noise from the second data transmission.

8. The method of claim 6, further comprising:
    determining the channel quality for the first transmission strategy based on an estimate of channel quality for the first data transmission after interference cancellation of the second data transmission.

9. The method of claim 1, wherein the at least one transmission strategy comprises at least one single user transmission strategy and at least one multiple-user transmission strategy.

10. The method of claim 1, wherein the plurality of potential transmission strategies are assembled into one or more transmission strategy sets, the method further comprising:
    selecting the at least one transmission strategy from the plurality of potential transmission strategies, wherein the at least one transmission strategy comprises one or more transmission strategies from each of the one or more transmission strategy sets.

11. The method of claim 1, wherein each transmission strategy of the plurality of potential transmission strategies comprises any of a precoding matrix, a first set of spatial layers for the downlink transmissions to the UE, a second set of spatial layers for the downlink transmissions to at least one other UE, whether interference cancellation is applied to achieve the channel quality associated with the each transmission strategy, or combinations thereof.

12. A method of wireless communication at a base station, comprising:
receiving channel feedback from multiple user equipments (UEs) for non-orthogonal channels of a carrier;
sending, to one or more UEs of the multiple UEs, respective sets of potential transmission strategies for the one or more UEs for downlink transmissions over the carrier based at least in part on the channel feedback;
receiving respective channel quality associated with at least a subset of each of the respective sets of potential transmission strategies from the one or more UEs;
selecting one or more transmission strategies for a set of downlink transmissions based at least in part on the respective channel quality received from the one or more UEs; and
transmitting the set of downlink transmissions to at least a subset of the multiple UEs over one or more of the non-orthogonal channels according to the selected transmission strategies.

13. The method of claim 12, wherein the sending the respective sets of potential transmission strategies for the one or more UEs comprises:
grouping the one or more UEs for the respective sets of potential transmission strategies based at least in part on the channel feedback, wherein UEs grouped for a transmission strategy are assigned to at least partially overlapping resources of the non-orthogonal channels for the transmission strategy.

14. The method of claim 13, wherein the respective sets of potential transmission strategies comprise a first transmission strategy associated with a first potential UE group, wherein at least one UE of the first potential UE group utilizes a single spatial layer for the first transmission strategy.

15. The method of claim 13, wherein the respective sets of potential transmission strategies comprise a first transmission strategy associated with a first potential UE group, wherein at least one UE of the first potential UE group utilizes multiple spatial layers for the first transmission strategy.

16. The method of claim 13, wherein the respective sets of potential transmission strategies comprise a first transmission strategy associated with a first potential UE group, wherein transmissions for the first transmission strategy to at least two UEs of the first potential UE group are orthogonal.

17. The method of claim 13, wherein the respective sets of potential transmission strategies comprise a first transmission strategy associated with a first potential UE group, wherein transmissions for the first transmission strategy to at least two UEs of the first potential UE group are non-orthogonal.

18. The method of claim 17, wherein a transmission power is split between the at least two UEs of the first potential UE group.

19. The method of claim 12, wherein the respective sets of potential transmission strategies comprise one or more sets of potential transmission strategies associated with each UE of the multiple UEs.

20. The method of claim 12, further comprising:
determining channel quality for at least one UE of the multiple UEs based on the received channel feedback; and
scheduling transmission resources of the non-orthogonal channels for the at least one UE of the multiple UEs based on the determined channel quality.

21. The method of claim 12, further comprising:
determining that channel conditions have changed for at least one UE of the multiple UEs based at least in part on the respective channel quality received from the at least one UE; and
triggering reporting of updated channel feedback from the at least one UE.

22. An apparatus for wireless communication by a user equipment (UE), comprising:
a processor; and
a memory in electronic communication with the processor and instructions stored in the memory, the instructions being executable by the processor to:
report channel feedback for non-orthogonal channels of a carrier to a base station;
receive, in response to the reported channel feedback, a plurality of potential transmission strategies for downlink transmissions from the base station over the carrier;
report channel quality for at least one transmission strategy of the plurality of potential transmission strategies; and
receive a downlink transmission from the base station over one or more of the non-orthogonal channels according to a transmission strategy selected from the at least one transmission strategy.

23. The apparatus of claim 22, wherein the instructions are executable by the processor to:
determine a channel feedback matrix based on a channel matrix and a noise covariance matrix for the non-orthogonal channels; and
report at least one component of the channel feedback matrix in the channel feedback.

24. The apparatus of claim 23, wherein the channel feedback matrix is further determined based on a precoding matrix.

25. The apparatus of claim 22, wherein a first transmission strategy of the plurality of potential transmission strategies comprises a first data transmission for the UE and a second data transmission for a different UE.

26. The apparatus of claim 25, wherein the instructions are executable by the processor to:
determine the channel quality for the first transmission strategy by estimating the channel quality for the first data transmission subject to noise from the second data transmission or estimating the channel quality for the first data transmission after interference cancellation of the second data transmission.

27. The apparatus of claim 22, wherein the plurality of potential transmission strategies are assembled into one or more transmission strategy sets, and wherein the instructions are executable by the processor to:
select the at least one transmission strategy from the plurality of potential transmission strategies, wherein the at least one transmission strategy comprises one or more transmission strategies from each of the one or more transmission strategy sets.

28. An apparatus for wireless communication by a base station, comprising:
  a processor; and
  a memory in electronic communication with the processor and instructions stored in the memory, the instructions being executable by the processor to:
  receive channel feedback from multiple user equipments (UEs) for non-orthogonal channels of a carrier;
  send, to one or more UEs of the multiple UEs, respective sets of potential transmission strategies for the one or more UEs for downlink transmissions over the carrier based at least in part on the channel feedback;
  receive respective channel quality associated with at least a subset of each of the respective sets of potential transmission strategies from the one or more UEs of the multiple UEs;
  select one or more transmission strategies for a set of downlink transmissions based at least in part on the respective channel quality received from the one or more UEs; and
  transmit the set of downlink transmissions to at least a subset of the multiple UEs over one or more of the non-orthogonal channels according to the selected transmission strategies.

29. The apparatus of claim 28, wherein the instructions are executable by the processor to:
  group the one or more UEs for the respective sets of potential transmission strategies based at least in part on the channel feedback, wherein UEs grouped for a transmission strategy are assigned to at least partially overlapping resources of the non-orthogonal channels for the transmission strategy.

30. The apparatus of claim 28, wherein the instructions are executable by the processor to:
  determine channel quality for at least one UE of the multiple UEs based on the received channel feedback; and
  schedule transmission resources of the non-orthogonal channels for the at least one UE of the multiple UEs based on the determined channel quality.

* * * * *